(12) United States Patent
Unchida et al.

(10) Patent No.: US 7,000,178 B2
(45) Date of Patent: Feb. 14, 2006

(54) ELECTRONIC DOCUMENT CLASSIFICATION SYSTEM

(75) Inventors: Jiyunji Unchida, Minato-ku (JP); Yoshinobu Hara, Minato-ku (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 822 days.

(21) Appl. No.: 09/886,340

(22) Filed: Jun. 19, 2001

(65) Prior Publication Data
US 2002/0016825 A1 Feb. 7, 2002

(30) Foreign Application Priority Data
Jun. 29, 2000 (JP) .............................. 2000-195924

(51) Int. Cl.
*G06F 15/00* (2006.01)
(52) U.S. Cl. .......................................... 715/500; 707/6
(58) Field of Classification Search ................ 715/530, 715/500; 707/3, 6
See application file for complete search history.

(56) References Cited

U.S. PATENT DOCUMENTS

| | | | | |
|---|---|---|---|---|
| 5,463,773 | A * | 10/1995 | Sakakibara et al. | 707/102 |
| 5,832,456 | A * | 11/1998 | Fox et al. | 705/10 |
| 5,835,922 | A * | 11/1998 | Shima et al. | 715/522 |
| 6,175,824 | B1 * | 1/2001 | Breitzman et al. | 705/36 |
| 6,253,169 | B1 * | 6/2001 | Apte et al. | 704/9 |
| 6,289,340 | B1 * | 9/2001 | Puram et al. | 707/5 |
| 6,411,936 | B1 * | 6/2002 | Sanders | 705/10 |
| 6,430,559 | B1 * | 8/2002 | Zhai | 707/5 |
| 6,442,555 | B1 * | 8/2002 | Shmueli et al. | 707/101 |
| 6,622,160 | B1 * | 9/2003 | Horvitz | 709/206 |
| 6,701,305 | B1 * | 3/2004 | Holt et al. | 706/45 |
| 6,701,318 | B1 * | 3/2004 | Fox et al. | 707/10 |
| 6,714,967 | B1 * | 3/2004 | Horvitz | 709/206 |
| 2002/0023051 | A1 * | 2/2002 | Kunzle et al. | 705/38 |

(Continued)

FOREIGN PATENT DOCUMENTS

JP 10-187834 7/1998

OTHER PUBLICATIONS

Ho et al., Decision combination in multiple classifier systems, IEEE 1994, pp. 66-75.*

(Continued)

*Primary Examiner*—Cong-Lac Huynh
(74) *Attorney, Agent, or Firm*—Fenwick & West LLP

(57) ABSTRACT

An electronic document classification system for classifying electronic documents received through a network is provided. The classification system comprises a criteria table for storing predetermined criteria for items included in the electronic documents and a score counter provided corresponding to each of the electronic documents. For each of the items included in the electronic documents, the classification system compares the item with a corresponding criterion stored in the criteria table, obtains a score based on the comparison result, and adds the obtained score to the score counter. Therefore, the resultant value of the score counter indicates a sum of the scores obtained for the items included in the electronic document corresponding to the score counter. The classification system assigns a priority to each of the electronic documents in accordance with the value of the score counter corresponding to the electronic document. Thus, the electronic document received through a network are prioritized.

19 Claims, 25 Drawing Sheets

U.S. PATENT DOCUMENTS

| | | | |
|---|---|---|---|
| 2002/0059390 A1* | 5/2002 | Fletcher et al. | 709/206 |
| 2002/0111942 A1* | 8/2002 | Campbell et al. | 707/3 |
| 2002/0152175 A1* | 10/2002 | Armstrong et al. | 705/64 |
| 2002/0188486 A1* | 12/2002 | Gil et al. | 705/7 |
| 2003/0036963 A1* | 2/2003 | Jacobson et al. | 705/26 |
| 2004/0172457 A1* | 9/2004 | Horvitz | 709/207 |
| 2005/0144557 A1* | 6/2005 | Li et al. | 715/513 |

OTHER PUBLICATIONS

Notess, Searching the Web with Alta Vista, Database, Jul. 1996, vol. 19, iss. 3, p. 86, 3 pgs.*

* cited by examiner

FIG. 4A

| business case code | target volume | target investment | target material |
|---|---|---|---|
| 123456 | 100000 | 120000 | M100 |

FIG. 4B

| business case code | current cost | target cost |
|---|---|---|
| 123456 | 150000 | 130000 |

FIG. 4C

| partner code | existing/new | business record | ranking |
|---|---|---|---|
| 111111 | 1 | 1 | 3 |

FIG. 4D

| business case code | target score |
|---|---|
| 123456 | 30 |

| target volume > proposed volume | target volume ≦ proposed volume | proposed material does not match target material | proposed material matches target material, or, no target material specified |
|---|---|---|---|
| 0 | 5 | 0 | 5 |

| target investment > proposed investment | target investment ≦ proposed investment | target cost > proposed cost | target cost ≦ proposed cost |
|---|---|---|---|
| 10 | 0 | 10 | 0 |

| existing partner | new partner | the partner has a business record | the partner has no business record |
|---|---|---|---|
| 5 | 3 | 5 | 3 |

| ranked between first and third place | ranked between fourth and ninth place | ranked lower than ninth place |
|---|---|---|
| 10 | 5 | 3 |

$address ←—71 rejection notice ←—72

Business case    $name
Business case code: $code

Your estimation for the above business case is  ←—73
not acceptable

Cause: Your proposed cost exceeds the target
cost for the business case.

FIG. 8

Cost Estimation  $name  (code:$code)                #/##

Partner name      $tname

Partner address   $taddress

Partner code      $tcode

Total score       $tcnt    Priority   $trank

Proposed volume        $qty

Proposed investment    $cost1

Proposed cost          $cost2

Material               $material

Processing             $process

Assembly               $assembly

Management cost        $mngcost

Packing and Transport  $trans

Attached file          $attach

FIG. 19A

Cost Estimation Input Form

- Patent Code: 111111
- Patent Name: xx Co., Ltd.
- Business Case Code: 123456

- Purchase volume: 150000  example: 100000
- Process Investment: 110000  example: 100000
- Proposal Cost: 120000  example: 100000
- Material: M100

FIG. 19B

Cost Estimation Input Form

- Attachment: XXXXX.JPG  [Refer...]

FIG. 20

Inquiry of Cost Estimation

Business Case "A"  
(Code:123456)

Partner Code:111111    Total Score:50points  
Partner Name :xx Co., Ltd.    Priority :First  
Address :yyyyy......

| Estimation Condition | Volume | 150000 | 5 |
| --- | --- | --- | --- |
| | Investment | 110000 | 10 |
| | Material | M100 | 5 |
| Cost | Cost | 120000 | 10 |
| Partner | Existing/New | 1 | 5 |
| | Business record | 1 | 5 |
| | Ranking | 3 | 10 |

— 201

| Total Score | 50 |
| --- | --- |
| Priority | 1 |

— 203

View attached file — 204

| Recommendation | Investigation | Rejection | Final Acceptance |
| --- | --- | --- | --- |
| 1 | 0 | 0 | 0 |

— 202 to Approval — 205    to Modification — 206    to Printing — 207

Modification of Estimation
───────────────────────────
Business Case "A"   Partner Code: 111111   Total Score: 50points
(Code: 123456)      Partner Name: xx Co., Ltd.   Priority: First
                    Address: yyy...

[Marked ▼]   [Registration ▼]   [50] points ← 221
[Not marked]                    [1] place
 Marked
 Not marked                     ← 222

Final Acceptance Mark  [✓] is set   [ ] is not set ← 223

[            ]
(DD/MM)

[◄        ►]                    [◄        ►]
                                          ← 226
                                        to Inquiry
        ← 225

FIG. 25

```
                                                          2/10
  Cost Estimation for "A"  (Code:123456)         1/10

Partner Name    xx Co., Lts.

Partner Address  yyy...

Partner Code    111111

Total score     50points      Priority    first

Contents of Estimation

Volume         150000

Investment     180000

Cost           100000

Material       ----------

Processing     ----------

Assembly       ----------

Management Cost  ----------

Packing and Transport  ----------

Attached file
```

ELECTRONIC DOCUMENT CLASSIFICATION SYSTEM

FIELD OF THE INVENTION

The present invention relates to an electronic document classification system for classifying electronic documents received through a global network such as the Internet based on predetermined criteria.

BACKGROUND OF THE INVENTION

As communication through the Internet becomes widespread, the format of documents transferred to a company has changed from postal mail and facsimile to electronic mail and electronic file. Hereinafter, document data electronically transferred through a network is referred to as an electronic document. Electronic documents transferred through the Internet to a company include various types of documents and are rapidly increasing in number.

When various types of electronic documents are received in a company, staffers in the company have to read the contents at least once in order to appropriately handle them. Based on the contents of the electronic documents, the staffers prioritize the electronic documents so that each of them is handled in accordance with the assigned priority. When an electronic document is to be processed by other staffers, the document has to be transferred to other staffers.

However, grasping the contents of electronic documents, prioritizing the electronic documents, and handling the electronic documents in accordance with assigned priorities impose heavy loads on the staffers because the number of electronic documents is growing.

SUMMARY OF THE INVENTION

It is an object of the invention to provide an electronic document classification system for classifying electronic documents received through a network based on predetermined criteria.

According to one aspect of the present invention, an electronic document classification system for classifying electronic documents received through a network is provided. The classification system comprises a criteria table for storing predetermined criteria for items included in the electronic documents and a score counter provided corresponding to each of the electronic documents. For each of the items included in the electronic documents, the classification system compares the item with a corresponding criterion stored in the criteria table, obtains a score based on the comparison result, and adds the obtained score to the score counter. Therefore, the resultant value of the score counter indicates a sum of the scores obtained for the items included in the electronic document corresponding to the score counter. The classification system assigns a priority to each of the electronic documents in accordance with the value of the score counter corresponding to the electronic document.

Thus, the received electronic documents are classified in accordance with the assigned priorities, thereby improving the efficiency of handling the electronic documents.

According to another aspect of the invention, the criteria table is provided corresponding to the kinds of the electronic documents. Thus, various kinds of the electronic documents are automatically classified.

According to one embodiment of the present invention, the classification system determines whether the electronic document is acceptable based on the assigned priority. If it is determined that the electronic document needs to be rejected, the classification system generates an electronic mail for a rejection notice. If the electronic document is determined to be acceptable, the classification system generates an electronic mail for an acceptance notice.

According to one embodiment of the invention, the electronic documents are received through the Internet. The classification system provides a user an input form page in which the user inputs the contents of the electronic document. When the user pushes a transfer button on the input form page, the electronic document is transferred to the classification system through the Internet. Since the electronic document is received in a predetermined format, it can be more efficiently processed thereafter.

According to another aspect of the invention, the classification system provides an internal process means for allowing a user to activate an internal process as to the electronic documents. The internal process includes inquiring, approving, modifying and printing. Thus, the user can handle the electronic documents taking the assigned priorities into account.

When a printing process is activated by the user, the classification system lays out the contents of the electronic document on paper in accordance with the size of the paper. If an attached file is included in the electronic document, the classification system places the attached file in a specified position of the paper. Thus, the electronic document is printed in easy-to-read format.

When a modification process is activated by the user, the classification system provides the user with a page in which the user can change the value of the assigned priority of the electronic document.

The classification system comprises a history data storage for storing the progress of handling the electronic document. The user can check on the progress on a screen.

BRIEF DESCRIPTION OF THE DRAWINGS

FIG. 4A shows examples of data structures of an estimation condition table;

FIG. 4B shows examples of data structures of a cost reference table;

FIG. 4C shows examples of data structures of a partner table;

FIG. 4D shows examples of data structures of a determination table;

FIG. 5 shows an example of a data structure of a score table according to an embodiment of the present invention;

FIG. 7 shows an example of an electronic mail template for a rejection notice according to an embodiment of the present invention;

FIG. 8 shows an example of a printing template according to an embodiment of the present invention;

FIGS. 19A and 19B show an example of a business case input form screen according to an embodiment of the present invention;

FIG. 20 shows an example of an inquiry screen according to an embodiment of the present invention;

FIG. 22 shows an example of a modification screen according to an embodiment of the present invention;

FIG. 25 shows an example of printed estimation data according to an embodiment of the present invention.

DETAILED DESCRIPTION OF THE PREFERRED EMBODIMENTS

Figure 1:
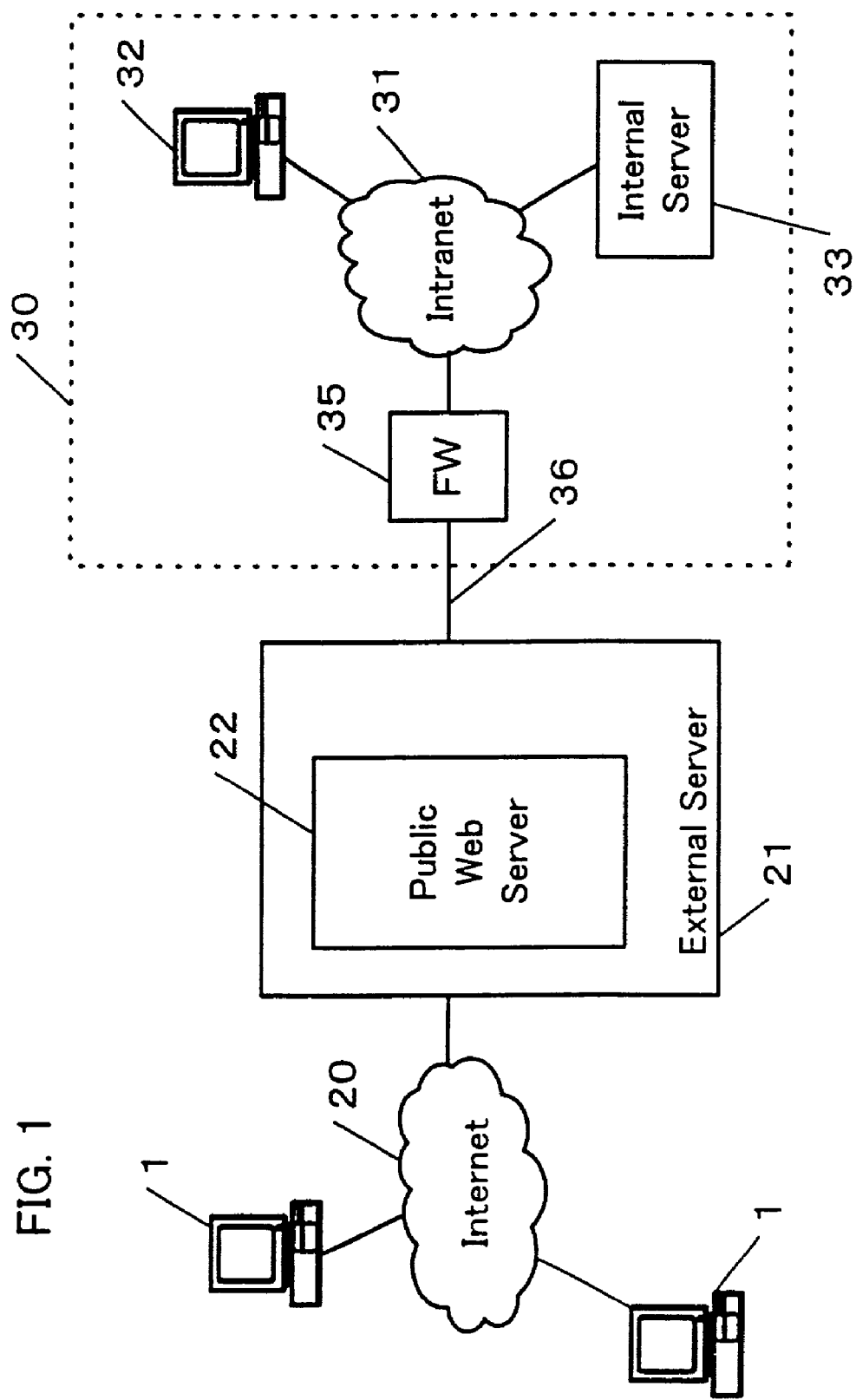
FIG. 1 is a block diagram showing network connection of an electronic document classification system according to an embodiment of the present invention.

FIG. 1 shows network connection of an electronic document classification system according to an embodiment of the present invention. A system 30 is provided in a company X. A plurality of personal computers 32 are connected to Intranet 31 through a LAN provided in the company X. Each of the personal computers 32 can access an internal server 33.

The system 30 is connected to an external server 21 provided outside the company X via a firewall 35 and a private line 36. The firewall is a router having the function of screening packets. The firewall selects a packet in accordance with data included in the header of the packet such as a source host address, a destination host address, and the type of protocol. In the present embodiment, the firewall 35 is configured to accept packets transferred from the external server 21 to the internal server 33 and to reject other incoming data.

The external server 21 is operated by a computer company. The external server 21 provides a user with a web site of the company X through the Internet 20 under contract with the company X. According to the present embodiment, the web site of the company X includes general pages such as a page for company's prospectus and an introduction of new products, and business pages for communicating with the company X's partners. These pages are generated by the company X and are uploaded to a public Web server 22 from the internal server 33.

Access to the business pages is permitted to only partners each having an ID (identification code) and password authorized by the company X. For example, when a partner 1 enters an URL address of a home page of the company X, the top page of the home page is displayed on a browser of the partner's personal computer 1. The top page has a button for entering into business pages. When the button is clicked, the page having ID and password fields is displayed. The partner 1 inputs its ID and password in the respective fields, and clicks a transfer button. After that, an encryption technology using an SSL (Secure Sockets Layer) is applied to data communication between the browser of the personal computer of the partner 1 and the public Web server 22.

When the ID and password are transferred to the public Web server 22, an authentication process is performed. When it is determined that the partner is authentic, the HTML document of a main page of the business pages is transferred to the browser of the partner 1. Since the transmission and authentication technology in the Internet are well known, the technology will not be discussed in further detail herein.

Figure 2:
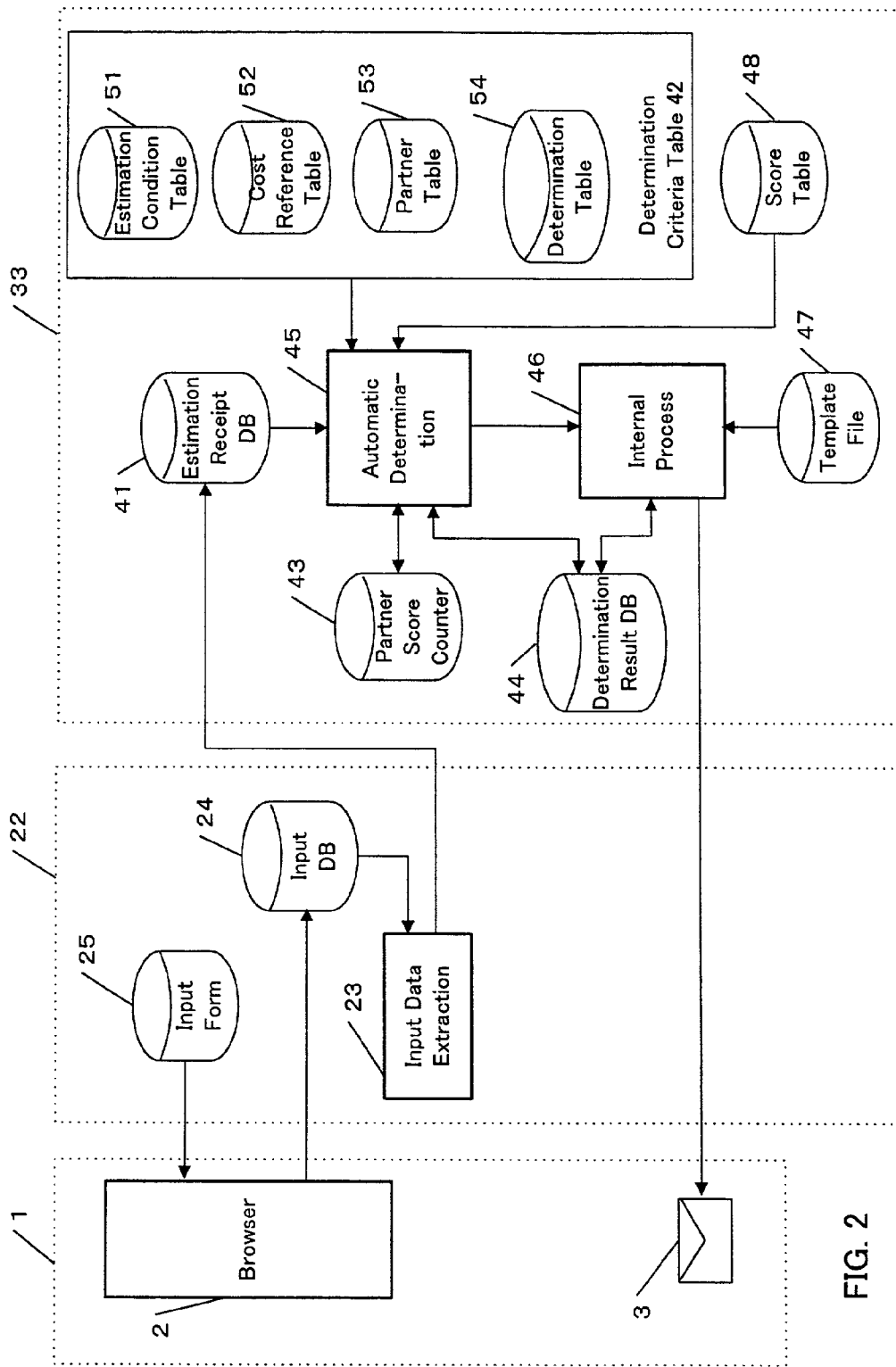
FIG. 2 is a functional block diagram of an electronic document classification system according to an embodiment of the present invention.

FIG. 2 is a functional block diagram of the electronic document classification system. In the present embodiment, in response to a business case "A" presented by the company X, each business partner transfers a cost estimation to the company X. The company X automatically assigns a priority to the cost estimation received from each partner. However, the electronic document classification system can be applied to other various types of electronic documents.

Data of a cost estimation electronically transferred from a partner to the company X is hereinafter referred to as "an estimation data unit". In one example described below, it is assumed that an estimation data unit for the business case "A" having a business case code "123456" is transferred from a partner having a partner code of "111111".

As described above, a browser 2 for data communication through the Internet is provided in the partner's personal computer 1. The partner 1 can access the business pages of the company X through the browser 2.

The public Web server 22 comprises an input form file 25 and an input database 24 (hereinafter a database is referred to as a DB). The input form file 25 includes input forms for predetermined types of documents. The input form for input of a cost estimation proposed by the partner 1 is also included in the input form file 25. The input DB 24 temporarily stores estimation data units transferred from the browser 2.

The internal server 33 of the company X comprises an estimation receipt DB 41, a determination criteria table 42, a partner score counter 43, a determination result DB 44, a template file 47 and a score table 48. These databases and tables will be discussed with reference to FIGS. 3 through 8.

Figure 3:
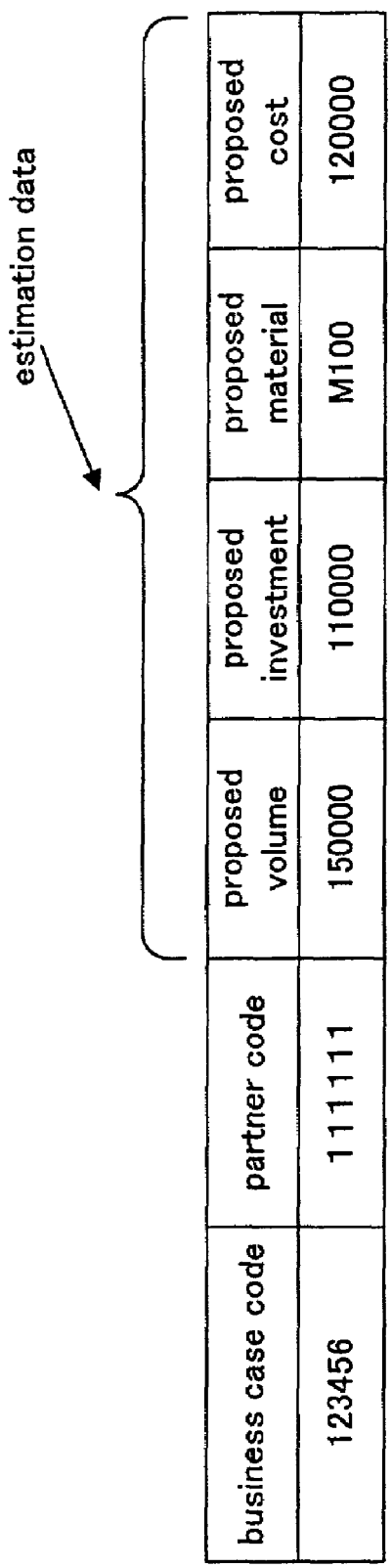
FIG. 3 shows an example of a data structure of an estimation receipt database according to an embodiment of the present invention.

FIG. 3 shows an example of a data structure of the estimation receipt DB 41. The estimation receipt DB 41 stores estimation data units. The estimation receipt DB 41 includes fields for business case code, partner code, proposed volume, proposed investment, proposed material, and proposed cost. Other fields may be included. The values shown in FIG. 3 are one example.

The determination criteria table 42 stores predetermined criteria for examining estimation data units. The determination criteria table 42 further comprises an estimation condition table 51, cost reference table 52, partner table 53, and determination table 54, as shown in FIG. 2.

FIG. 4A shows one example of a data structure of the estimation condition table 51. The estimation condition table 51 includes fields for target volume, target material, and target investment, values of which being predetermined for each business case.

The target volume indicates the volume required for the business case. For example, when the business case relates to a component, the target volume field includes the number of the component. The target investment indicates a target figure of total cost of the business case. For example, when the business case relates to a component, the target figure is a total of materials cost, processing cost, management cost, etc. Alternatively, the target investment may be specified for each of items included in the business case.

The target material indicates the kind of material (for example, resin) or a material name required for the business case. As shown in FIG. 4A, a code "M100" included in the target material field indicates the kind of a specific material. A plurality of target materials may be specified in the target material field. Moreover, no target material may be specified (that is to say, the field may be blank).

FIG. 4B shows one example of a data structure of the cost reference table 52. The cost reference table 52 includes fields for current cost and target cost, values of which being predetermined for each business case.

The current cost is determined based on the specification of a current product if the current product corresponding to the business case exists. For example, when the business case is based on a new specification which is an improvement over the current specification, the current cost is determined based on the specification of the current product. When the new specification is not related to an existing product, the current cost field may be left blank. The target cost is a target figure of the costs for the business case. For example, if the business case relates to a component, then the target cost is represented by a target figure of an estimated unit price of the component.

FIG. 4C shows an example of a data structure of the partner table 53. The partner table 53 includes fields for existing/new partner, business record, and ranking in the industry, values of which being predetermined for each partner.

The existing/new field may include the value of 1 for a partner who has dealings with the company X at present, and may include the value of 0 for a new partner who has no dealing with the company X at present. The business record field may include the value of 1 if the partner has a business record with other companies, and may include the value of 0 if the partner has no business record with other companies. Alternatively, the value of the field may be changed in accordance with the magnitude of business with other companies. The ranking field includes the ranking in the industry. In the example shown in the FIG. 4C, the partner code "111111" indicates an existing partner, who has a business record with other companies and is ranked in third place in the industry.

FIG. 4D shows one example of a data structure of the determination table 54. The determination table 54 includes a target score field, value of which being predetermined for each business case. The target score indicates the score required to be met by the business case. In this example, the target score of the business case code "123456" is 30 points.

FIG. 5 shows an example of a data structure of the score table 48. The score table 48 stores the scores to be assigned to each item included in the estimation data unit based on comparison with the criterion for each item. For example, if a proposed volume included in the estimation data unit stored in the estimation receipt DB 41 is smaller than the target volume stored in the estimation condition table 51, then score 0 will be assigned.

Alternatively, a score to be assigned may be changed in accordance with the magnitude of difference between each item in the estimation data unit and corresponding criterion. For example, if proposed cost is 1.1 times lower than the target cost, then the score to be assigned may be set to 3 points.

Alternatively, the score to be assigned may be included in the criteria table 42 or may be defined as a variable in a computer program of determining a score.

Figure 6A:
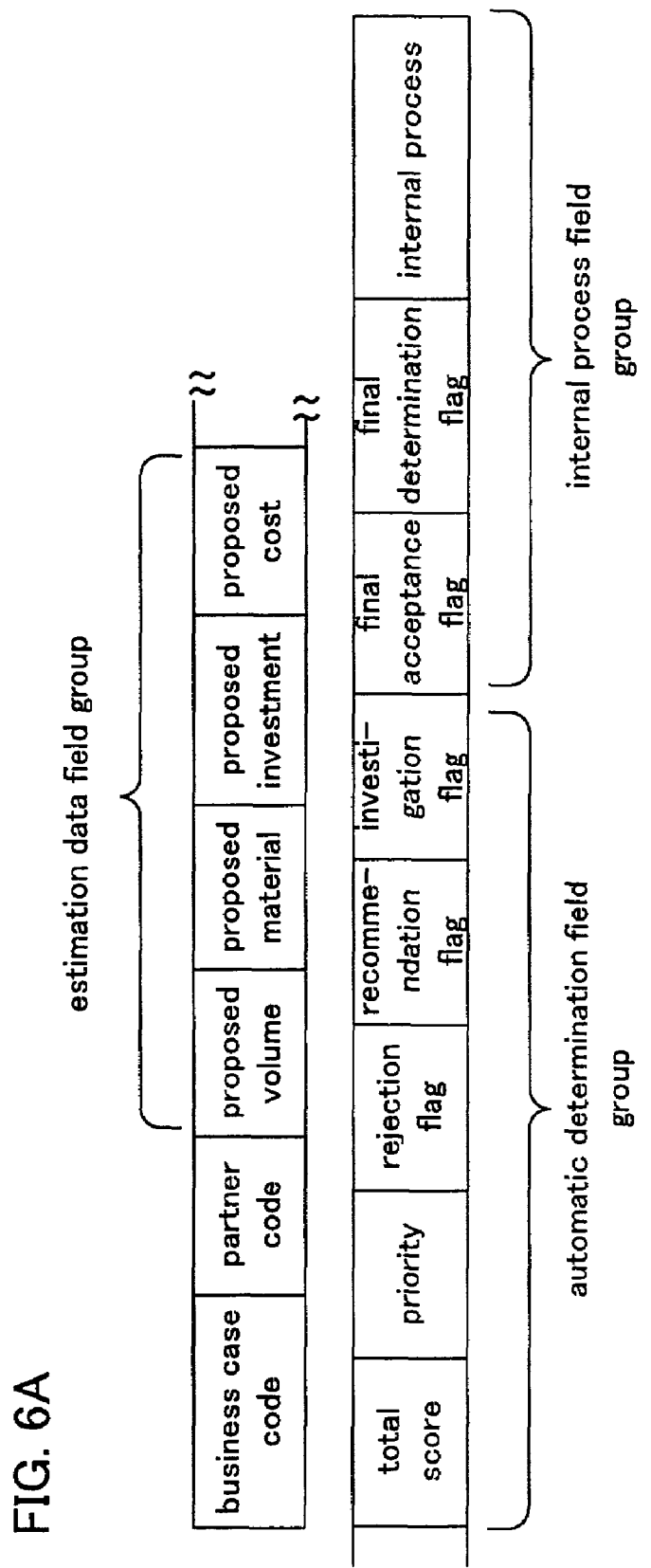
FIG. 6A shows an example of a data structure of a determination result database according to an embodiment of the present invention.

FIG. 6A shows an example of a data structure of the determination result DB 44. For each business case and partner, the determination result DB 44 includes a group of estimation data fields, a group of automatic determination fields, and a group of internal process fields. The estimation data field group includes the same data as the estimation data field of the estimation receipt DB 41 (see FIG. 3).

The total score field in the automatic determination field group includes a total score which is a sum of the scores assigned to each item included in the estimation data unit transferred from the partner. The priority field includes a priority assigned to the estimation data unit. In the present example, if a rejection flag field includes the value of 1, it means that the cost estimation for the business case is rejected from the viewpoint of the estimation condition and cost. If the recommendation flag field includes the value of 1, it means that the cost estimation for the business case is recommended. If an investigation flag field includes the value of 1, it means that a further investigation about the partner is needed.

If a final acceptance flag field in the internal process field group includes the value of 1, it means that the cost estimation is determined to be acceptable. If the final determination flag field includes the value of 1, it means that the approval of the cost estimation has been completed.

Figure 6B:
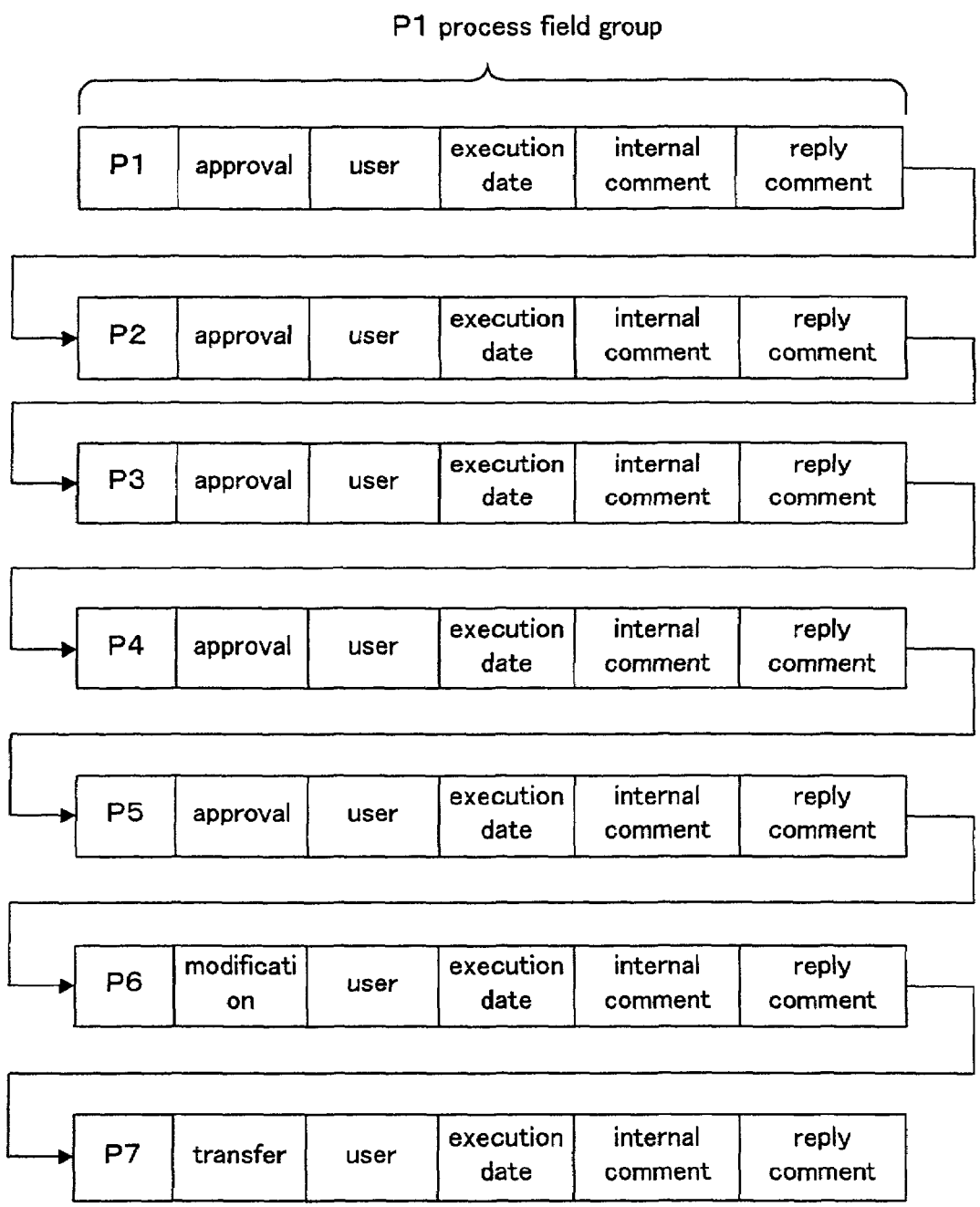
FIG. 6B shows an example of a data structure of an internal process field of the determination result database according to an embodiment of the present invention.

FIG. 6B shows the details of the internal process field included in the internal process field group shown in FIG. 6A. The internal process field includes groups of P1 to P7 process fields, where Pn (n is an integer) indicates a symbol identifying the process stage at which the company X internally processes the estimation data unit. Pn can be represented by an arbitrary symbol, and the number of process stages can be arbitrarily provided. The internal process is performed via interaction between a user and a personal computer.

In the present embodiment, each process field group includes fields for operation type (approval, modification or transmission), user, execution date, internal comment, and reply comment. "approval" means that the cost estimation has been approved by staffers. "modification" means that the values of the automatic determination filed group has been modified by staffers. "transfer" means that an electronic mail for notifying the partner of acceptance/rejection of the cost estimation has been transferred. The internal comment is a comment described for the internal management of the company X. The reply comment is a comment inserted into the body of the acceptance/rejection electronic mail.

Referring to FIG. 2 again, the template file 47 includes electronic mail templates for generating the acceptance/rejection electronic mail. The template file 47 further includes a printing template used in printing data stored in the determination result DB 44 on a predetermined size of paper.

FIG. 7 shows an example of an electronic mail template for the rejection electronic mail. The template includes a destination field 71, subject field 72, and text field 73, where "$" indicates a parameter into which data is set when the electronic mail is generated. For example, a business case code extracted from the determination result DB 44 is set in $code of the text field 73.

FIG. 8 shows a printing template for A4-size paper, where "$" indicates a parameter in which corresponding data is set in printing. For example, a partner code extracted from the determination result DB 44 is set in $tcode.

The general operation of the electronic document classification system according to the present embodiment is described below with reference to FIG. 2. The partner 1 requests an input form page for the business case "A", for example by entering an address of the input form page. The public Web server 22 extracts the input form page from the input form file 25 and transmits it to the browser 2.

FIGS. 19A and 19B show an example of the input form page for the business case "A". A screen 191 shown in FIG. 19B shows the state where a screen 190 shown in FIG. 19A is scrolled down. The partner 1 enters ID (i.e. partner code), name, and business case code in fields 192. Furthermore, the partner 1 enters the contents of a cost estimation for the business case in fields 193. As shown by a field 195, an attached file can be specified. The attached file may include image data such as a motion picture. Alternatively, a plurality of attached files may be specified.

After inputting the cost estimation, the partner 1 clicks a transfer button 196. The cost estimation entered in fields 192 and 193 and the attached file specified in the field 195 are transferred to the public Web server 22 through the Internet 20.

An input form for a new partner whose ID and password have not been issued by the company X may be included in the input form file 25. In addition to the fields shown in FIGS. 19A and 19B, the input form for a new partner further includes fields in which name, address, telephone number, business record, etc. of the partner are entered. Thus, a new partner can transfer a cost estimation to the company X.

A page in which a cost estimation is entered is made in the form of HTML document. The cost estimation input via a browser is transferred as MIME (Multipurpose Internet Mail Extensions) data to a CGI (common gateway interface) program in the public Web server 22. The CGI program is a standard interface function between a user and a server. The CGI program stores the received estimation data in the input DB 24.

If a predetermined amount of estimation data is stored in the input DB 24, or if a predetermined time (for example, 30 minutes) has elapsed, an input data extraction part 23 extracts the estimation data stored in the input DB 24, and transfers it to the internal server 33. Thus, the security of the internal server of the company X is guaranteed since the estimation data received from the partner 1 is temporally stored in the public Web server 22 provided outside the company X.

The estimation data transferred from the input data extraction part 23 is stored in the estimation receipt DB 41 provided in the internal server 33 of the company X. The automatic determination part 45 reads each unit of the estimation data. As described above referring to FIG. 3, in the present example, the estimation data unit includes four items, that is to say the proposed volume, proposed investment, proposed material and proposed cost. The automatic determination part 45 compares the value of each item with the criterion corresponding to the item stored in the determination criteria table 42. For example, the automatic determination part 45 compares a proposed volume with the target volume stored in the estimation condition table 51. Based on the comparison result, the automatic determination part 45 obtains a score from the score table 48, and adds it to the partner score counter 43. Thus, the scores of the items included in the estimation data unit are added to the partner score counter 43. In other words, the resultant value of the partner score counter 43 indicates a total of the scores assigned to each item included in the estimation data unit.

The automatic determination part 45 then assigns a priority to the estimation data unit based on the total score provided by the value of the partner score counter 43. The automatic determination part 45 stores the total score and the assigned priority in the total score and priority fields, respectively, as shown in FIG. 6A.

The internal process part 46 can display the estimation data unit and the result determined by the automatic determination part 45 on a screen. The internal process part 46 can also print the estimation data unit and/or the determination result in accordance with the printing template included in the template file 47.

Thus, staffers of the company X can determine whether the cost estimation is acceptable by referring to the corresponding estimation data unit and the determination result displayed on a screen and/or printed on paper. Furthermore, the internal process part 46 can change the determination result in response to an instruction provided by staffers.

The internal process part 46 generates and transfers an electronic mail for notifying the partner of acceptance/rejection using the electronic mail templates included in the template file 47 in response to an instruction from staffers. Alternatively, an acceptance/rejection message may be displayed on a page which the partner can access.

The internal process part 46 stores history data of the internal process as to the estimation data unit in the internal process field of the determination result DB 44. Internal process includes approving the cost estimation, modifying the determination result for the cost estimation, and transferring an electronic mail for rejection/acceptance notice.

The above functional blocks (the input extraction part 23, automatic determination part 45 and internal process part 46) are typically implemented by computer programs stored in any storage such as a magnetic disc, optical disc, and non-volatile memory. Alternatively, the functional blocks may be implemented by any hardware configured to perform functions described above. The above databases and tables may be provided in any storage. The tables may be defined in a computer program.

Figure 9:
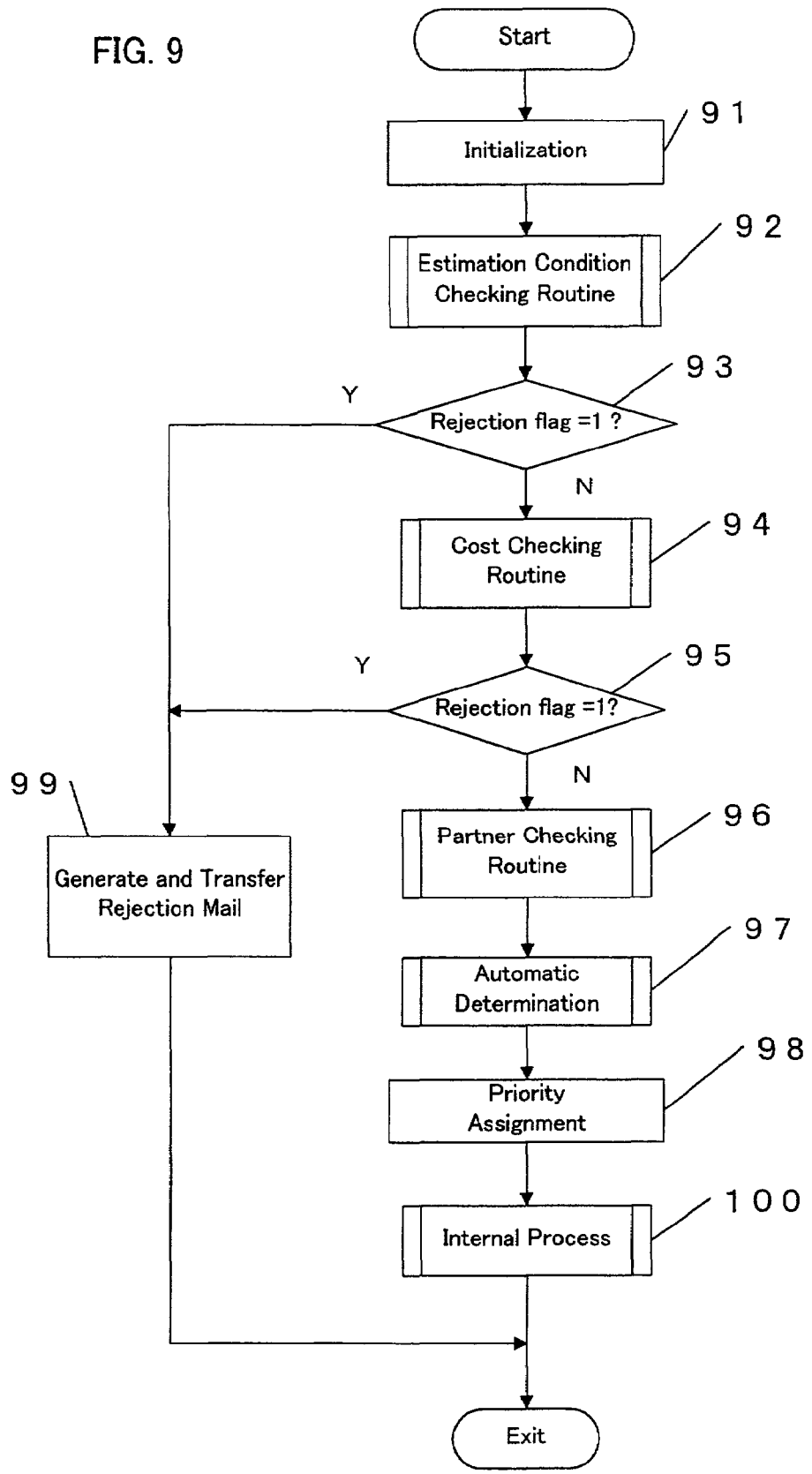
FIG. 9 is a flowchart showing the entire automatic determination process according to an embodiment of the present invention.

FIG. 9 is a flowchart of the entire process performed by the automatic determination part 45 and internal process part 46. The process may be activated in response to an instruction from staffers in the company X. For example, staffers can instruct the automatic determination part 45 to perform the process by clicking a button provided on a page. Alternatively, the process can be activated when a deadline for the business case has passed.

Steps 91 through 98 are performed by the automatic determination part. In step 91, the rejection flag, recommendation flag, investigation flag, final acceptance flag, final determination flag, total score and priority are initialized to zero. In step 92, an estimation condition checking routine (FIG. 10) is performed. If the rejection flag is set to one in the estimation condition checking routine (93), then the electronic mail template for a rejection notice is extracted from the template file 47. As described above, parameters on the template are set and a rejection mail is generated. The rejection mail is transferred (99).

If the rejection flag is not one in step 93, a cost checking routine (FIG. 11) is performed (94). If the rejection flag is set to one in the cost checking routine (95), then the rejection mail is generated and transferred (99), as described above.

If the rejection flag is not one in step 95, then a partner checking routine (FIG. 12) is performed (96), and then the automatic determination routine is performed (97). In step 98, a priority is assigned to each estimation data unit in accordance with a total score for the estimation data unit. In other words, the higher a partner's total score is, the higher priority level the partner is assigned. The total score is a total of the scores assigned to the estimation data unit in the routines of steps 92, 94 and 97, and is provided by the value of the partner score counter 43. It is preferable that the process of step 98 is performed after the automatic determination has been completed on all estimation data units for the business case.

In another embodiment, it may be determined whether the estimation data unit is acceptable based on the total score and/or assigned priority without performing an internal process routine to be performed in step 100. The automatic determination part 45 may automatically generate rejection/acceptance electronic mail in accordance with the determination.

Step 100 is performed by the internal process part 46. In step 100, an internal process routine (FIG. 14) is performed to internally process the estimation data unit taking the determination result obtained in steps 97 and 98 into account.

Figure 10:
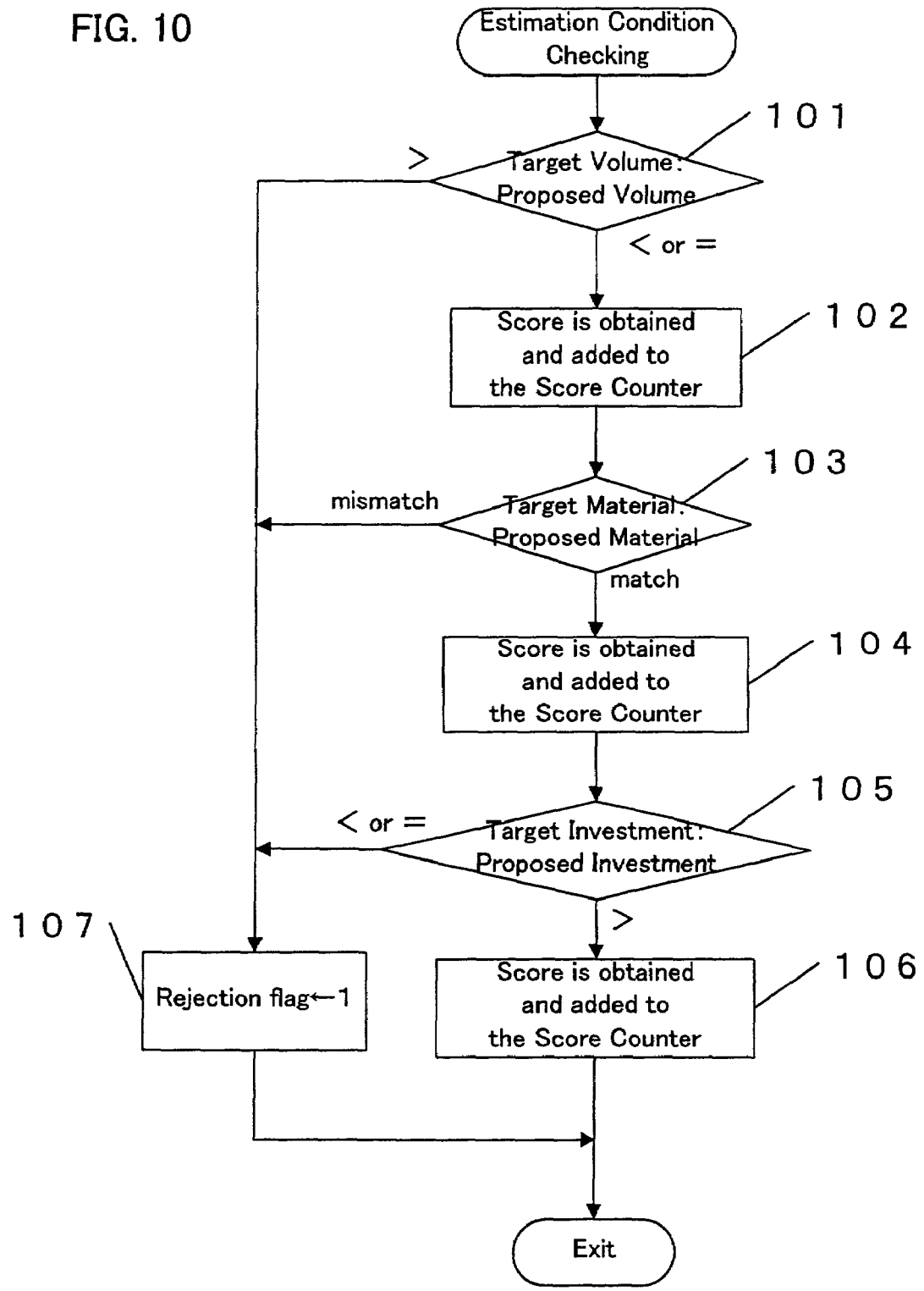
FIG. 10 is a flowchart showing an estimation condition checking routine according to an embodiment of the present invention.

FIG. 10 is a flowchart of the estimation condition checking routine shown in FIG. 9. In step 101, the estimation receipt DB 41 is accessed. The value included in the proposed volume field is extracted and compared with the target volume stored in the estimation condition table 51. If the proposed volume is smaller than the target volume, it means that the condition of the business case is not satisfied. Therefore, the rejection flag is set to one (107). If the proposed volume is equal to or larger than the target volume, then the score (5 points in this example shown in FIG. 5) is extracted from the score table 48 and is added to the partner score counter 43 (102).

In step 103, the value included in the proposed material field is extracted and compared with the target material stored in the estimation condition table 51. If the proposed material does not match the target material, it means that the condition of the business case is not satisfied. Therefore, the rejection flag is set to one (107). If the proposed material matches the target material, the score (5 points in this example) is extracted from the score table 48 and is added to the partner score counter 43 (104). As described above, there may be a plurality of target materials. In this case, if the proposed material matches one of the target materials, the answer of the determination step 103 is "match." If no target material is specified, the process of step 103 is skipped.

Alternatively, if the proposed material is included in or equivalent to the kind of the target material, then the answer of the determination step 103 is "match." By way of example, it is assumed that the material code M100 indicates resin, M101 indicates recycled resin, and M102 indicates ceramic resin. If the target material is M100 and the proposed material is M101 or M102, then it may be determined that the proposed material matches the target material. It is preferable that a table wherein these material codes are defined is stored in a memory.

In step 105, the value included in the proposed investment field is extracted and compared with the target investment stored in the estimation condition table 51. If the proposed investment is equal to or larger than the target investment, it means that the investment for the business case is not satisfied. Therefore, the rejection flag is set to one (107). If the proposed investment is smaller than the target investment, then the score (10 points in this case) is extracted from the score table 48 and is added to the partner score counter 43 (106).

Figure 11:
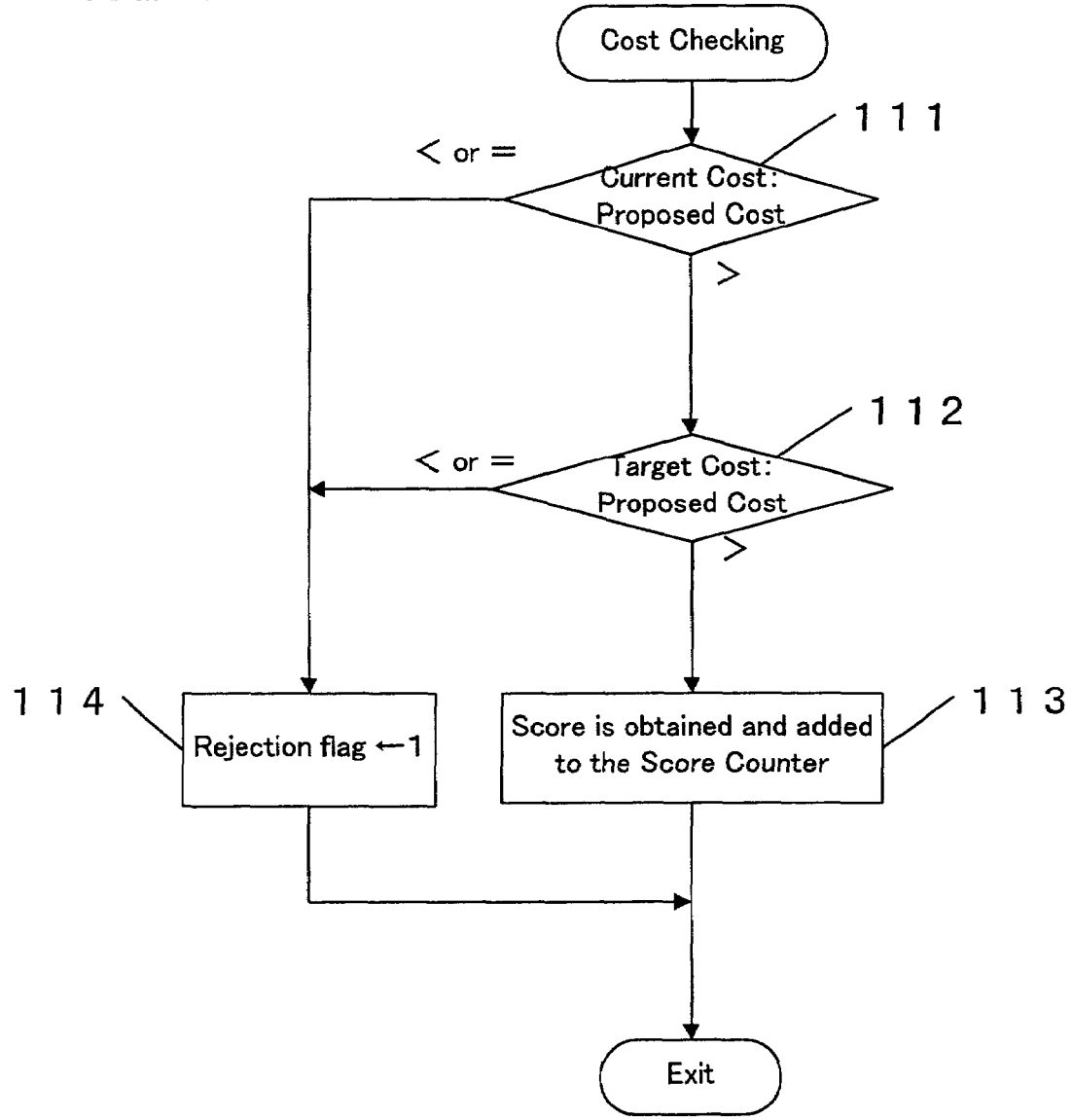
FIG. 11 is a flowchart showing a cost checking routine according to an embodiment of the present invention.

FIG. 11 is a flowchart of the cost checking routine shown in FIG. 9. In step 111, the value included in the proposed cost field stored in the estimation receipt DB 41 is extracted and compared with the current cost stored in the cost reference table 52. If the proposed cost is equal to or larger than the current cost, then the rejection flag is set to one (114). If the proposed cost is smaller than the current cost, the proposed cost is compared with the target cost of the cost reference table 52 (112). If the proposed cost is equal to or larger than the target cost, it means that the target cost for the business case is not satisfied. Therefore, the rejection flag is set to one (114). If the proposed cost is smaller than the target cost, then the score (10 points) is extracted from the score table 48 and is added to the partner score counter 43.

Figure 12:
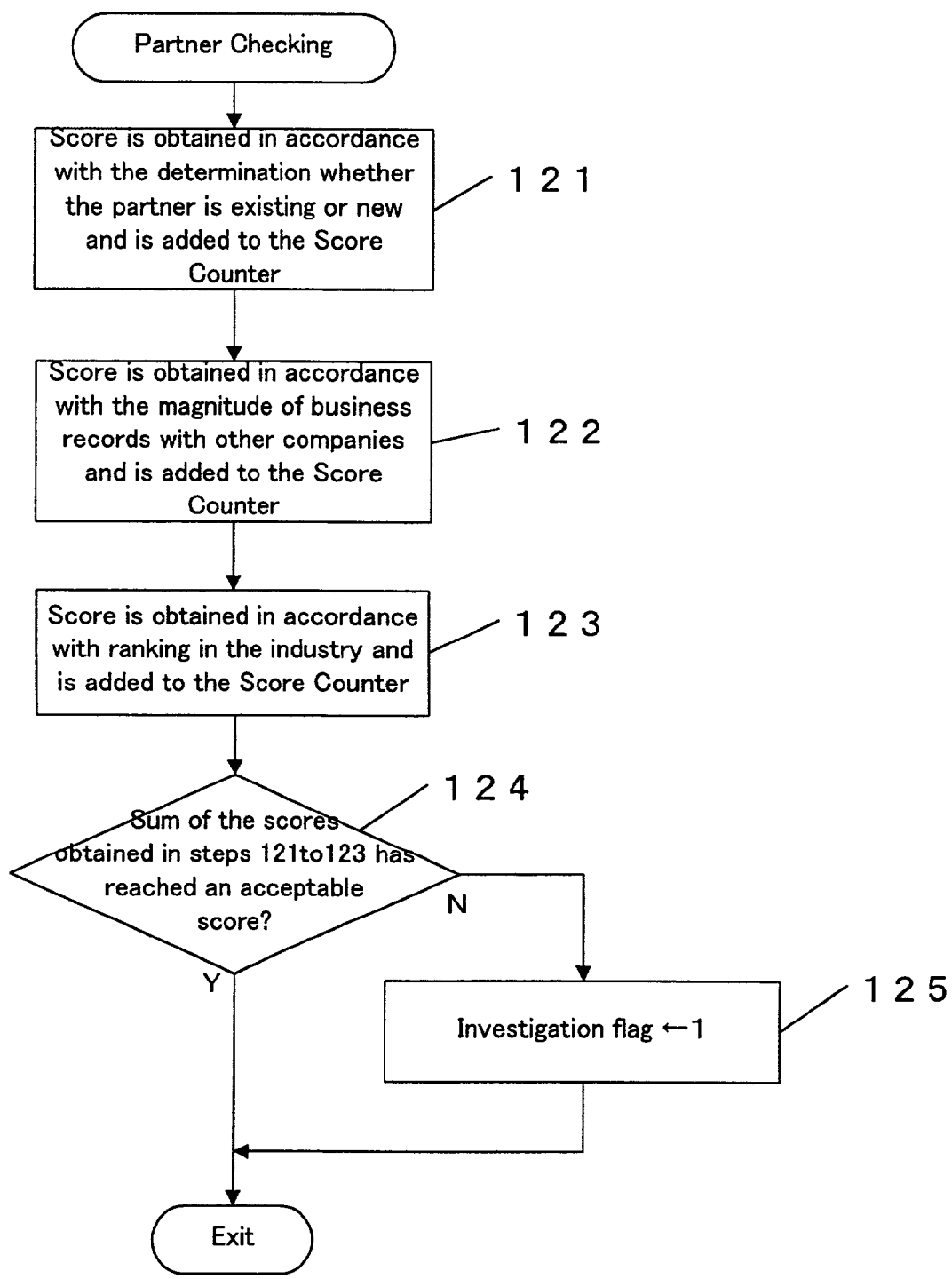
FIG. 12 is a flowchart showing a partner checking routine according to an embodiment of the present invention.

FIG. 12 is a flowchart of the partner checking routine shown in FIG. 9. In step 121, the value included in the existing/new field of the partner code is extracted from the partner table 53. If the extracted value is one, which indicates an existing partner, then a score (5 points in this example) is obtained from the score table 48 and is added to the partner score counter 43. If the extracted value is zero, which indicates a new partner, then a score (3 points in this example) is obtained from the score table 48 and is added to the partner score counter 43.

In step 122, the value included in the business record field of the partner code is extracted. If the extracted value is one, which indicates that the partner has a business record with other companies, then a score (5 points in this example) is obtained from the score table 48 and is added to the partner score counter 43. If the extracted value is zero, which indicates that the partner has no business record with other companies, then a score (3 points) is obtained from the score table and is added to the partner score counter 43.

In step 123, the value included in the ranking field of the partner code is extracted. A score is obtained from the score table 48 based on the extracted value and is added to the partner score counter 43. For example, if the value included in the ranking field is "3" as shown in FIG. 4C, which indicates that the partner is ranked in third place in the industry, then the score obtained from the score table 48 is "10".

In step 124, it is determined whether a sum of the scores obtained in steps 121 to 123 has reached a predetermined acceptable score (for example, 10 points). The acceptable score can be predefined in a program or a memory. If the sum has not reached the acceptable score, it means that furthermore investigation about the partner is needed. Therefore, the investigation flag is set to one (125).

Figure 13:
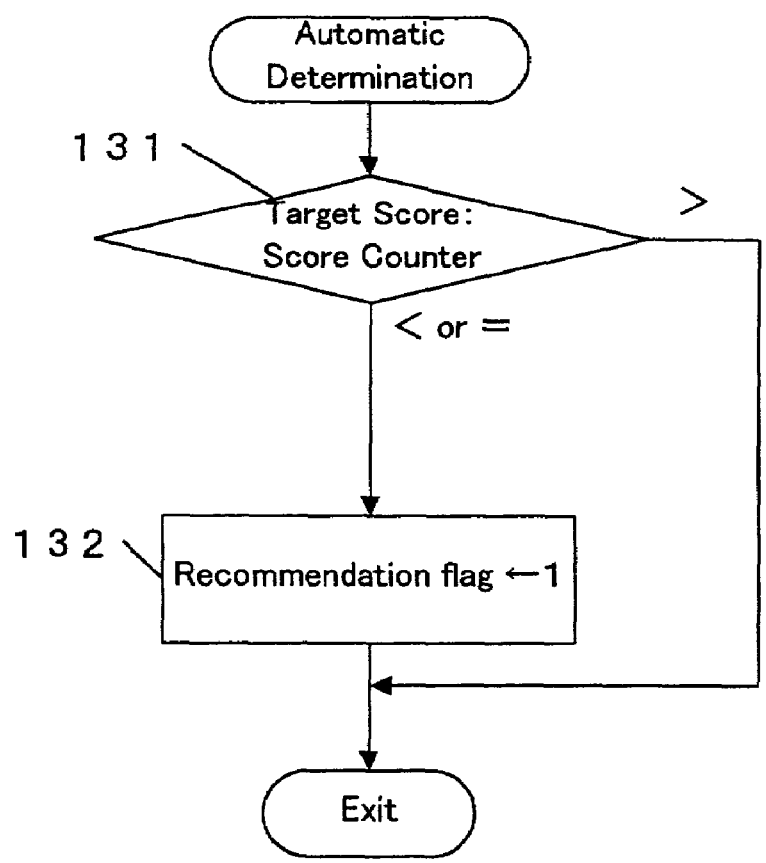
FIG. 13 is a flowchart showing an automatic determination routine according to an embodiment of the present invention.

FIG. 13 is a flowchart of the automatic determination routine shown in FIG. 9. In step 131, the value of the partner score counter 43 is compared with the target score of the business case stored in the determination table 54. The value of the partner score counter 43 indicates a total of the scores added up in the routines shown in FIGS. 10 to 12. If the value of the partner score counter 43 is equal to or larger than the target score, the recommendation flag is set to one (132). If the value of the partner score counter 43 is smaller than the target score, then the process is exited without setting the recommendation flag to one. Thus, referring to the value of the recommendation flag allows the partner who proposes the cost estimation satisfying the business case to be identified.

Figure 14:
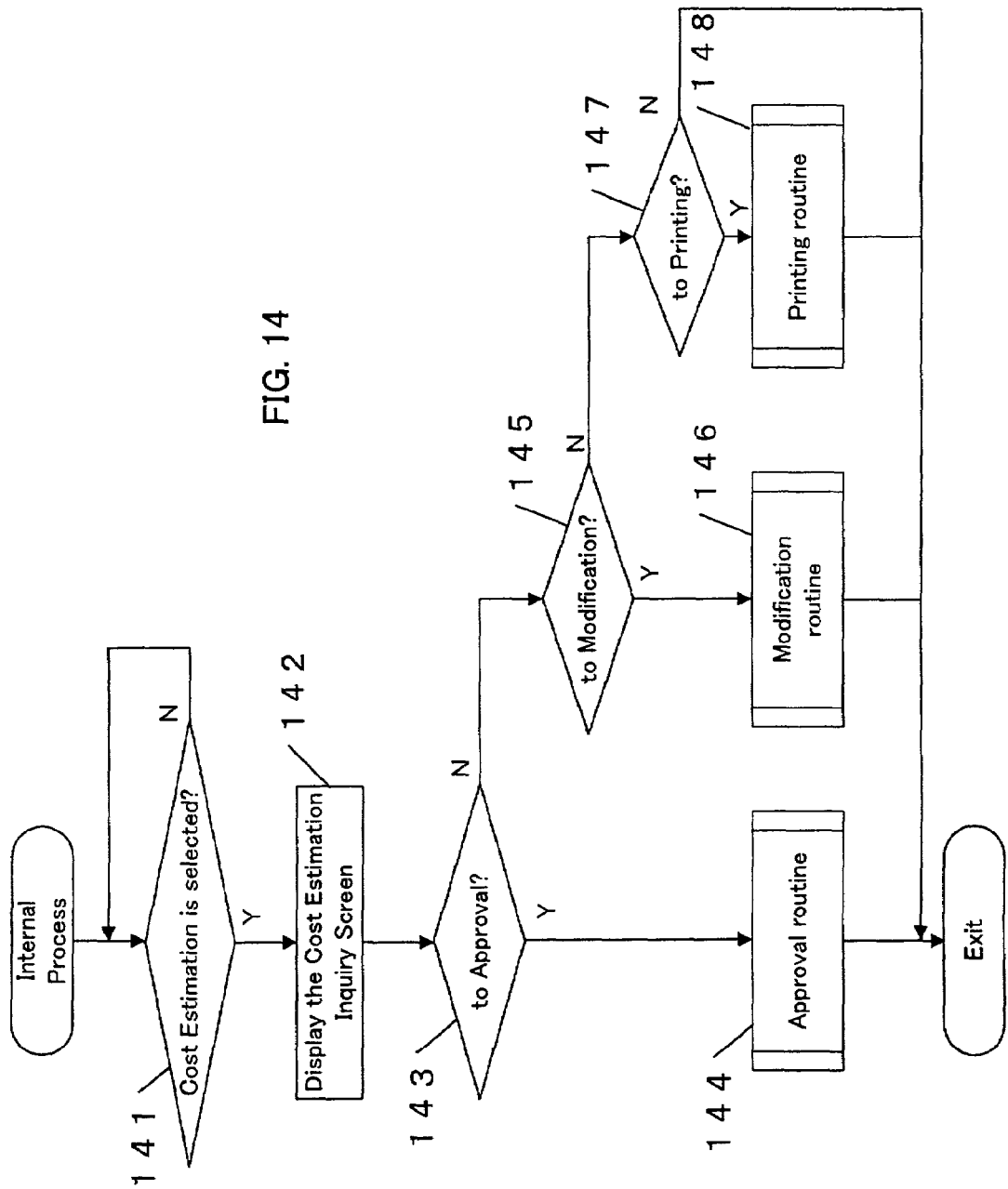
FIG. 14 is a flowchart showing an internal process according to an embodiment of the present invention.

FIG. 14 is a flowchart of the internal process routine shown in FIG. 9. For example, when staffers of the company X access a page where a cost estimation list for the business case is displayed, the routine is activated. The cost estimation list is displayed in order of priority determined by the automatic determination part 45.

In step 141, when a cost estimation on the list is selected, an inquiry screen of the selected cost estimation is displayed (142).

FIG. 20 shows an example of the inquiry screen. A screen 200 displays the volume, investment, material proposed by the partner, and the contents of the partner table 53 (201). Staffers can click "View attached file" 202 to view the contents of the attached file. The screen 200 further displays the scores assigned to each item of the cost estimation, as indicated by reference number 201. Moreover, the total score and priority of the cost estimation are displayed, as indicated by reference number 203, and the values of the recommendation flag, investigation flag, rejection flag, final acceptance flag are displayed, as indicated by reference number 204. The screen 200 may display other items as to the cost estimation.

In step 143, if "to Approval" 205 displayed at the lower portion on the screen 200 is clicked, then the approval routine (FIG. 15) is performed (144). If "to Approval" 205 is not clicked, then it is checked whether "to Modification" 206 is clicked (145). If "to Modification" 206 is clicked, then the modification routine (FIG. 16) is performed (146). If "to Modification" is not clicked, then it is determined whether "to Printing" 207 is clicked (147). If "to Printing" 207 is clicked, then the printing routine (FIG. 17) is performed (148).

Figure 15:
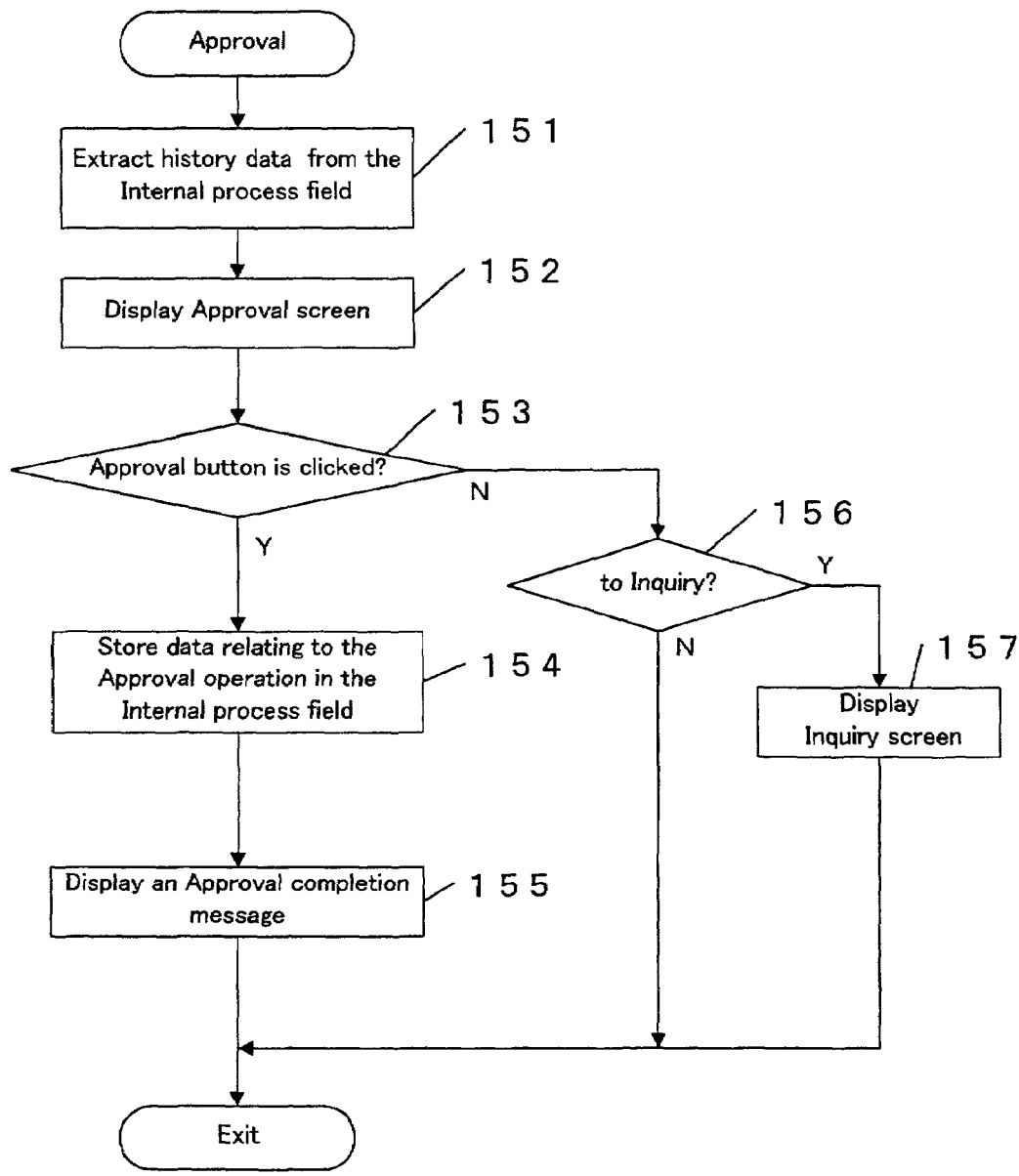
FIG. 15 is a flowchart showing an approving routine according to an embodiment of the present invention.

FIG. 15 is a flowchart of the approval routine shown in FIG. 14. In step 151, if any internal process (for example, the approval, modification and transfer processes) has been completed and its result has been stored in the internal process field as described above by referring to FIG. 6, then the values included in the internal process field are extracted as history data. Then, an approval screen is displayed (152).

Figure 21:
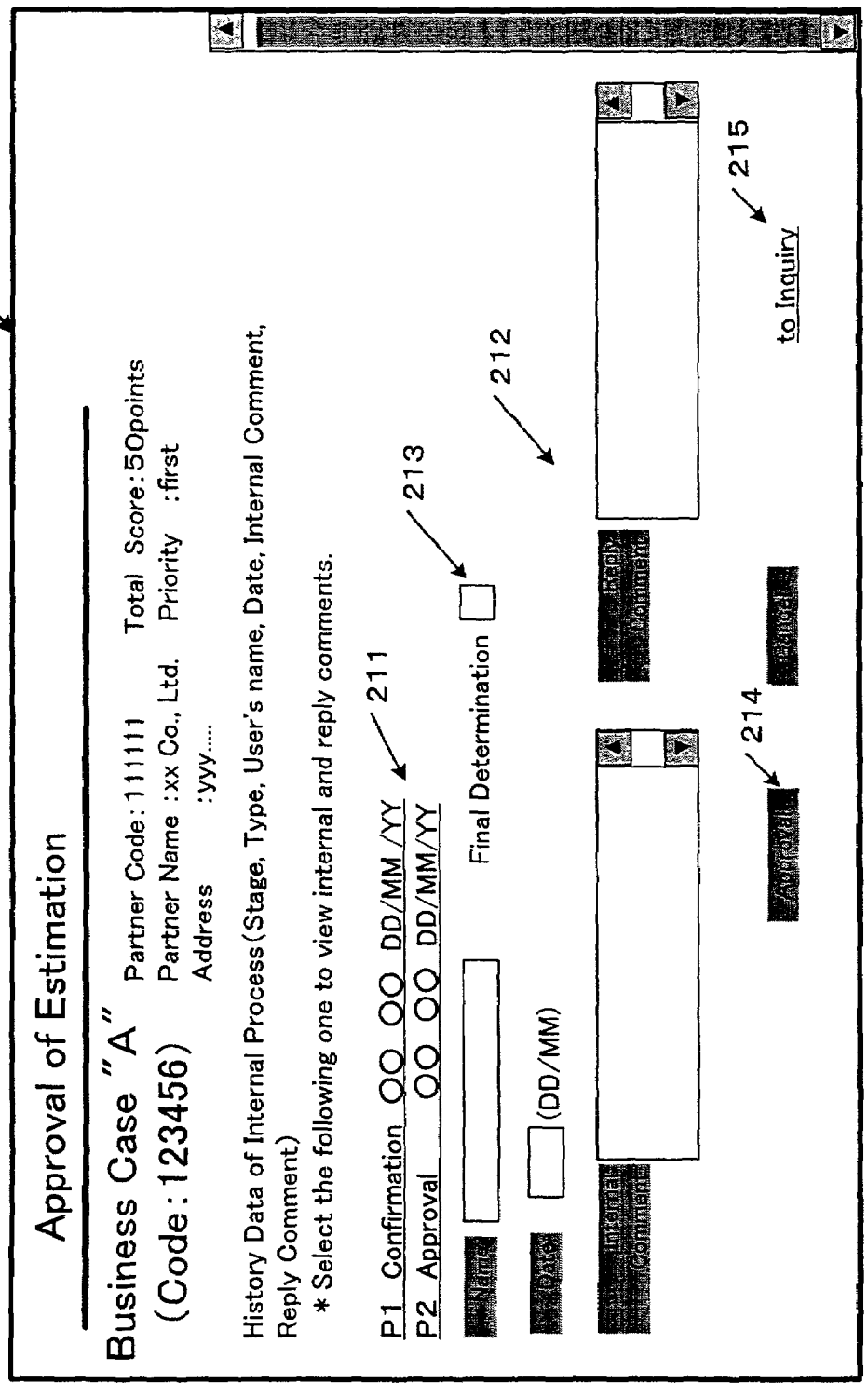
FIG. 21 shows an example of an approval screen according to an embodiment of the present invention.

FIG. 21 shows an example of the approval screen. On the screen 210, a list of internal process histories extracted in step 151 is displayed (211). When any one of the histories is clicked, the contents of it are displayed.

When staffers approve the cost estimation, the staffers enter his/her name, date, an internal comment, and a reply comment in fields 212. If the final approval is given to the cost estimation, a check box 213 of the final determination is marked.

Referring to FIG. 15 again, if an approval button 214 is clicked in step 153, then an identification of the process stage (for example, P3) is assigned and data entered in the approval screen 210 is stored in the internal process field of the determination result DB 44 (154). An approval completion message is displayed on the screen (155).

In step 153, if the approval button 214 is not clicked, and 'to Inquiry screen' 215 displayed at the lower portion on the screen 210 is clicked (156), then the inquiry screen shown in FIG. 20 is displayed (157).

Figure 16:
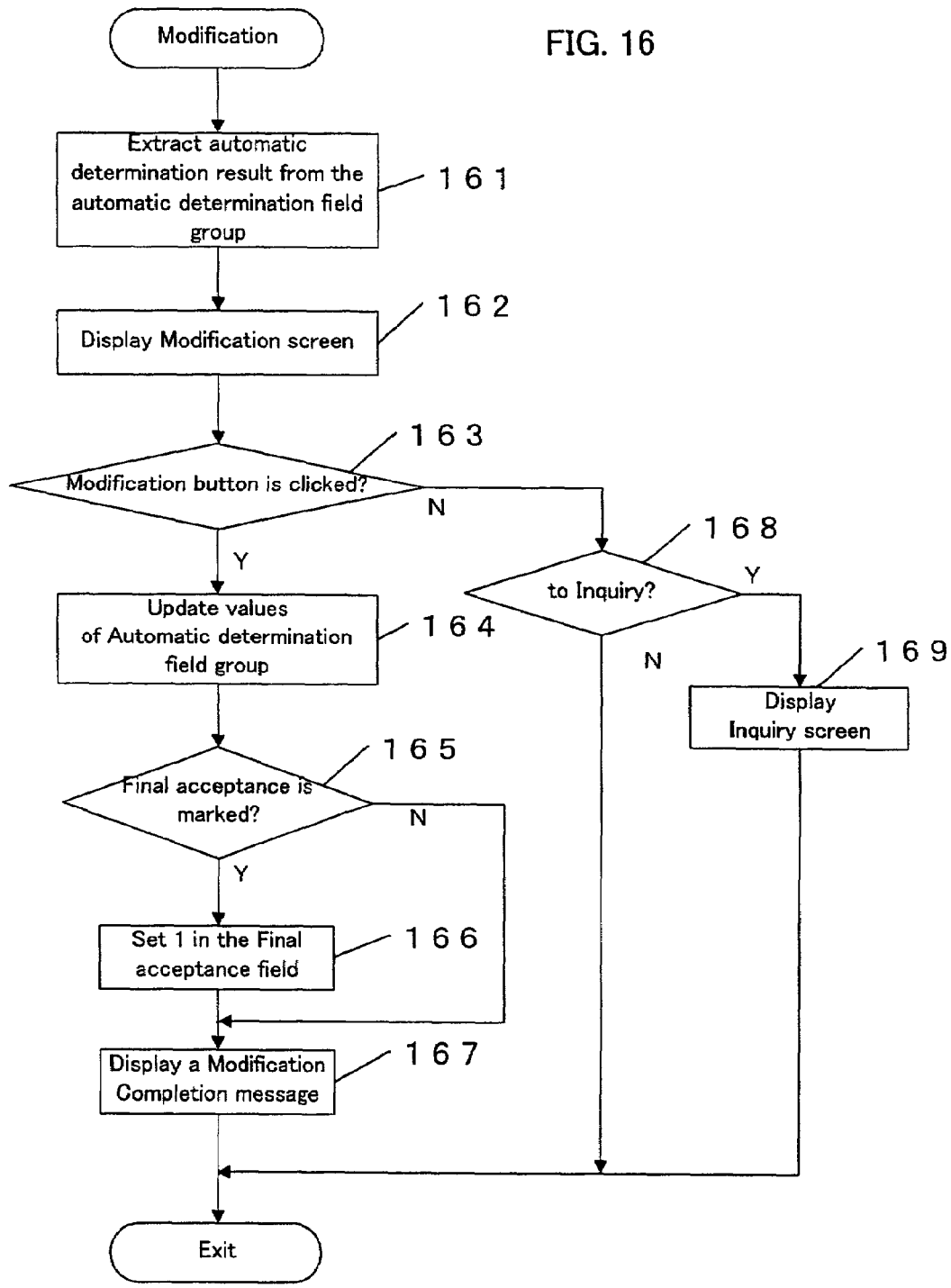
FIG. 16 is a flowchart showing a modification routine according to an embodiment of the present invention.

FIG. 16 is a flowchart of the modification routine shown in FIG. 14. In step 161, the values included in the automatic determination field group of the determination result DB 44 are extracted, and a modification screen is displayed (162).

FIG. 22 shows an example of the modification screen. A screen 220 includes fields 221 in which the recommendation flag, investigation flag, total score, and priority can be modified. Alternatively, the screen 220 is configured such that the score assigned to each item of the cost estimation may be modified.

The screen 220 includes a check box 222 of the final acceptance. When staffers determine that the cost estimation is acceptable taking the automatic determination result into account, then the staffers mark "is set" check box 222. When staffers modify any of the recommendation flag, investigation flag, total score, and priority in the fields 221, the staffers enter his/her name, date, an internal comment, and a reply comment in fields 223.

Referring to FIG. 16 again, in step 163, if a modification button 225 displayed at the lower portion on the screen 220 is clicked, then the values of the automatic determination field group of the determination result DB 44 are updated with the data entered in the screen 220 (164). If the "is set" check box 222 is marked (165), the value of the final acceptance field is set to one (166). A modification completion message is displayed on the screen (167).

If the modification button is not clicked in step 163, and 'to Inquiry screen' 226 displayed at the lower part on the screen 220 is clicked (168), then the inquiry screen shown in FIG. 20 is displayed (169).

Figure 17:
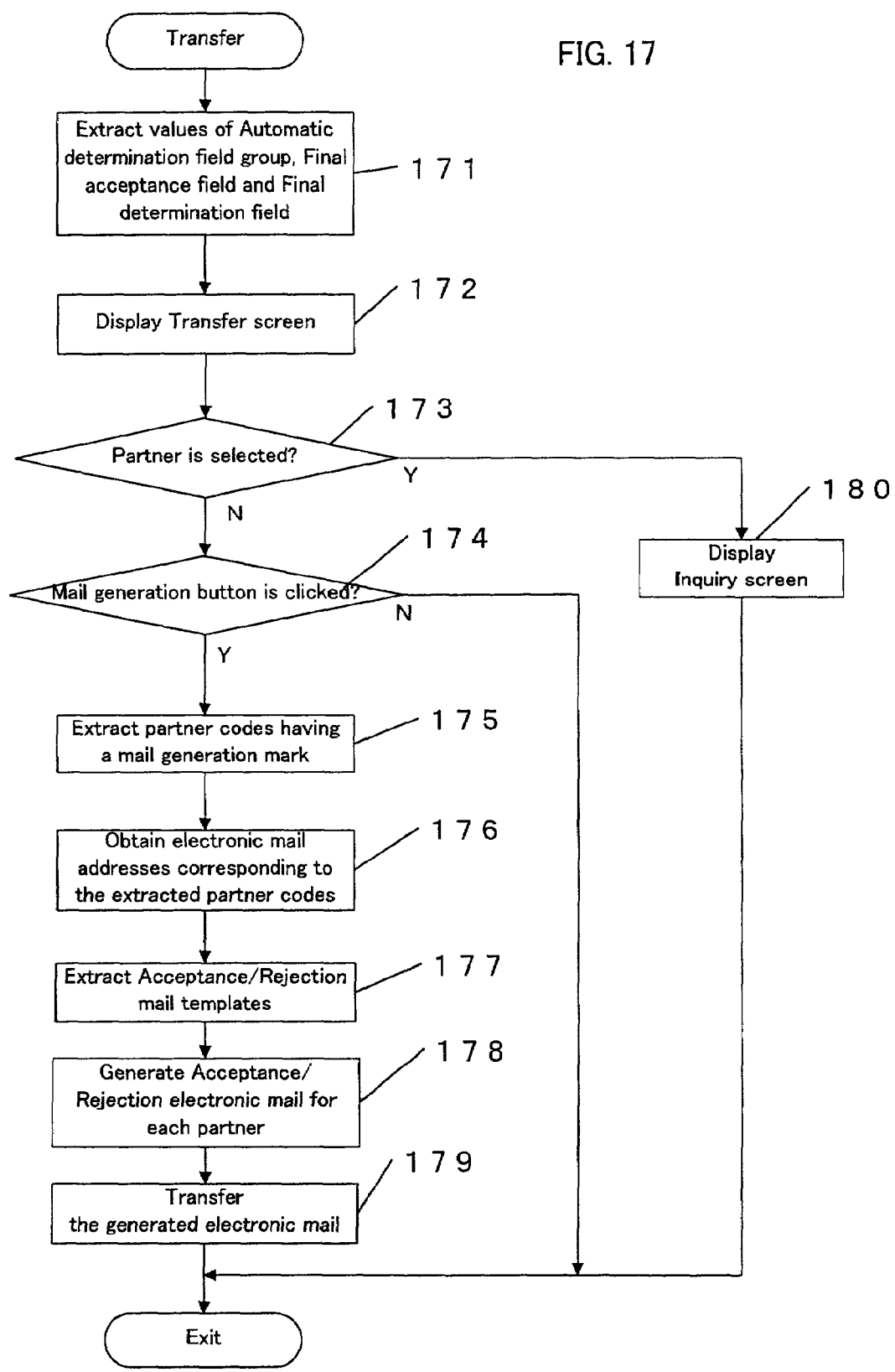
FIG. 17 is a flowchart showing a transfer routine according to an embodiment of the present invention.

FIG. 17 is a flowchart of the transfer routine shown in FIG. 14. In step 171, the values included in the automatic determination field group, final acceptance field, and final determination field of the determination result DB 44 are extracted, and a transfer screen is displayed (172).

Figure 23:
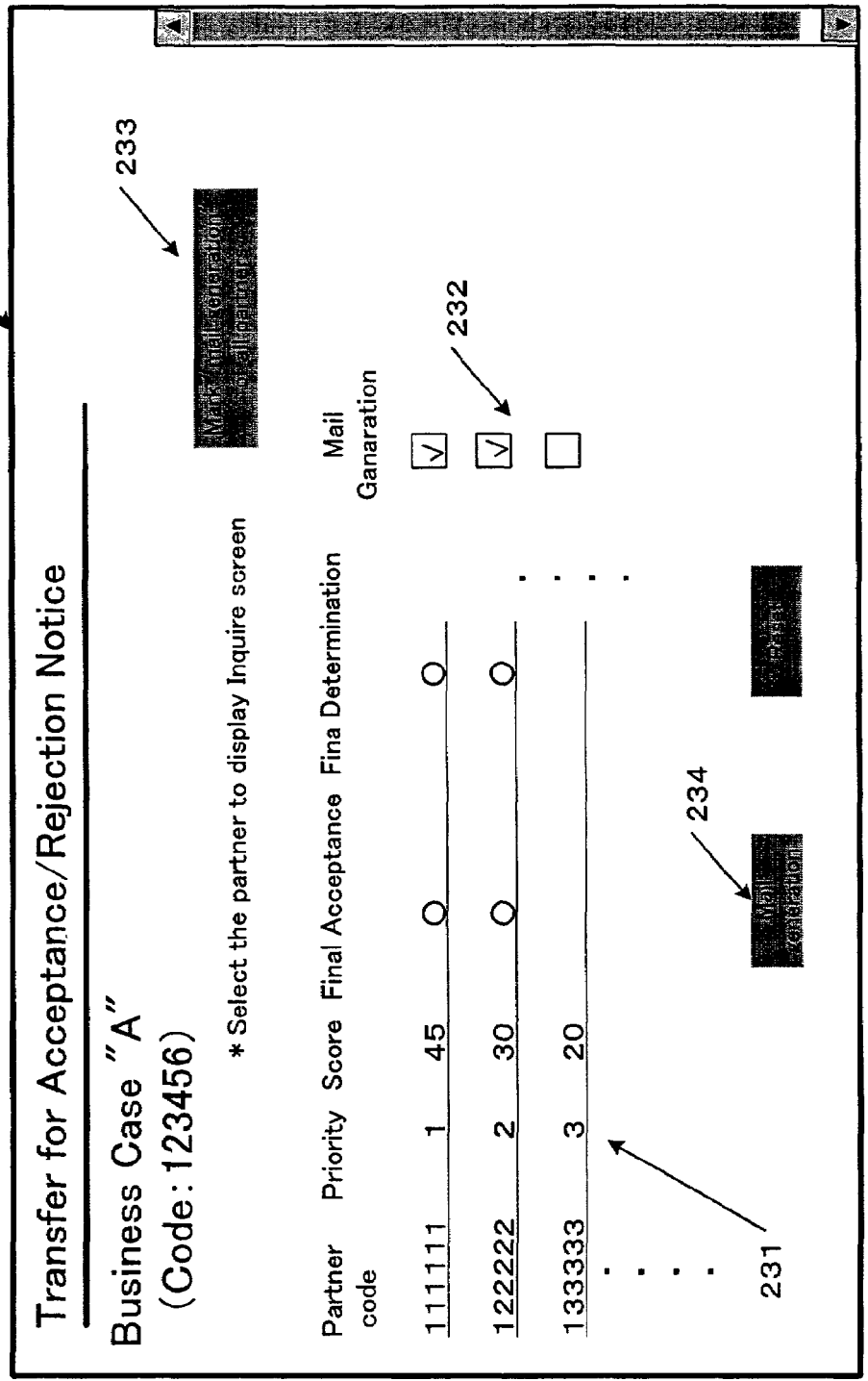
FIG. 23 shows an example of a transfer screen according to an embodiment of the present invention.

FIG. 23 shows an example of the transfer screen. A screen 230 displays a list of cost estimations for the business case. The list shows the priority and total score for each partner (231). Staffers can see which of the cost estimations is acceptable by referring to the final acceptance mark. Staffers can also see which of the cost estimations is finally approved by referring to the final determination mark. The cost estimations are listed in order of priority. Alternatively, partners having the final acceptance mark may be displayed at the top of the list.

Each partner has a "Mail Generation" check box 232. One or more check boxes 232 can be marked. An electronic mail is generated for each of partners corresponding to the marked check boxes. When "Mark "mail generation" of all partners" 233 is clicked, all the "Mail Generation" check boxes 232 are marked.

Referring to FIG. 17 again, if the partner is selected in step 173, then the inquiry screen shown in FIG. 20 is displayed for the selected partner (180). In step 174, if "Mail generation" button 234 is clicked, partner codes for which the check boxes 232 are marked are extracted (175). The electronic mail addresses corresponding to the extracted partner codes are obtained (176). The electronic mail addresses may be obtained in a database for storing the attributes of partners.

In step 178, the electronic mail templates of acceptance and rejection mail are extracted from the template file 47. Then, data to be set in the parameters on the templates is extracted from, for example, the determination result DB 44 (177). Thus, the electronic mail for each partner is generated (178). If the final acceptance flag is one and the final determination flag is one, then the electronic mail notifying the partner of acceptance of the cost estimation is generated. For other partners, the electronic mail notifying of rejection of the cost estimation is generated (178). The electronic mail generated in step 178 is transferred (179).

Figure 18:
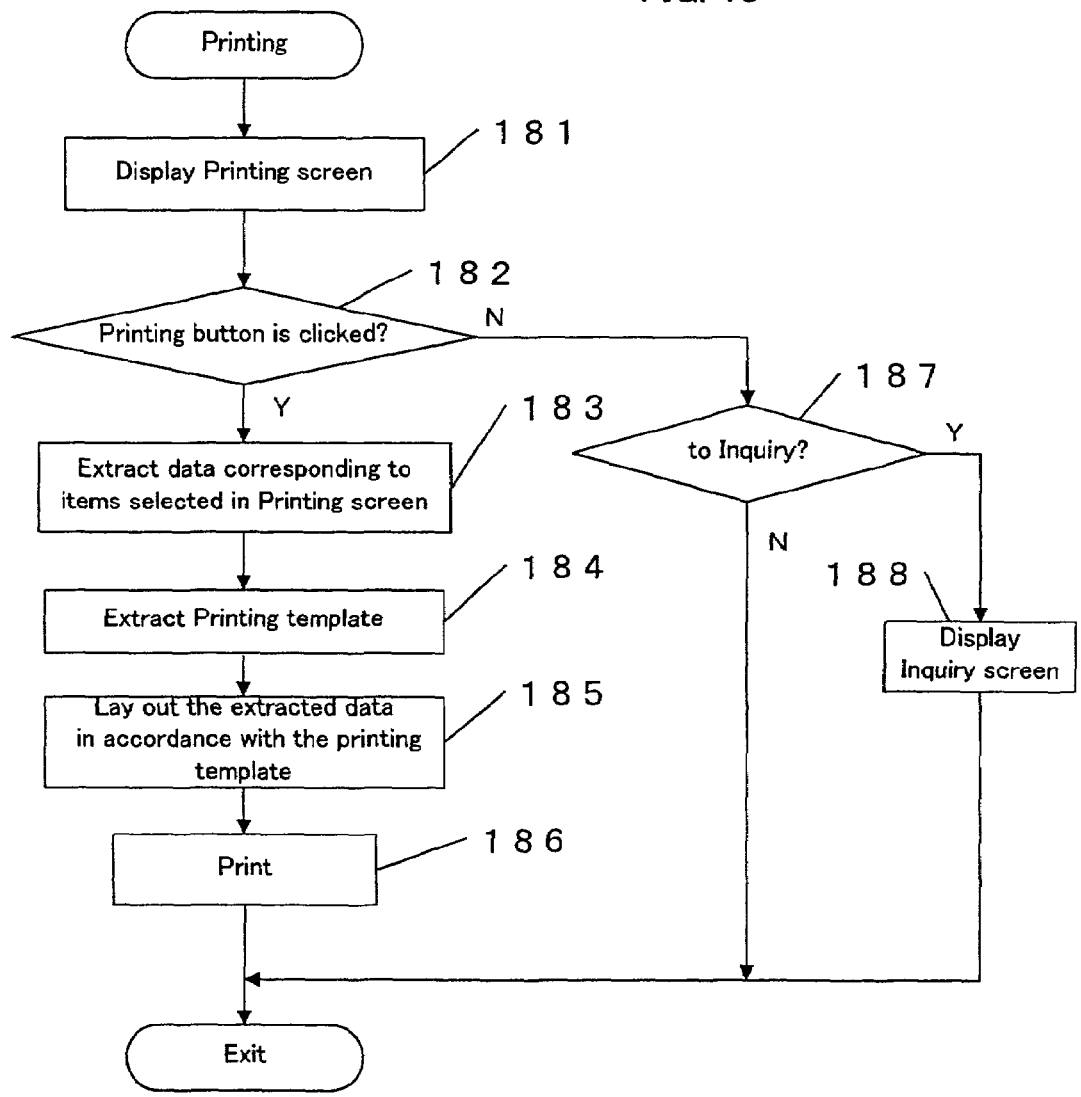
FIG. 18 is a flowchart showing a printing routine according to an embodiment of the present invention.
Figure 24:
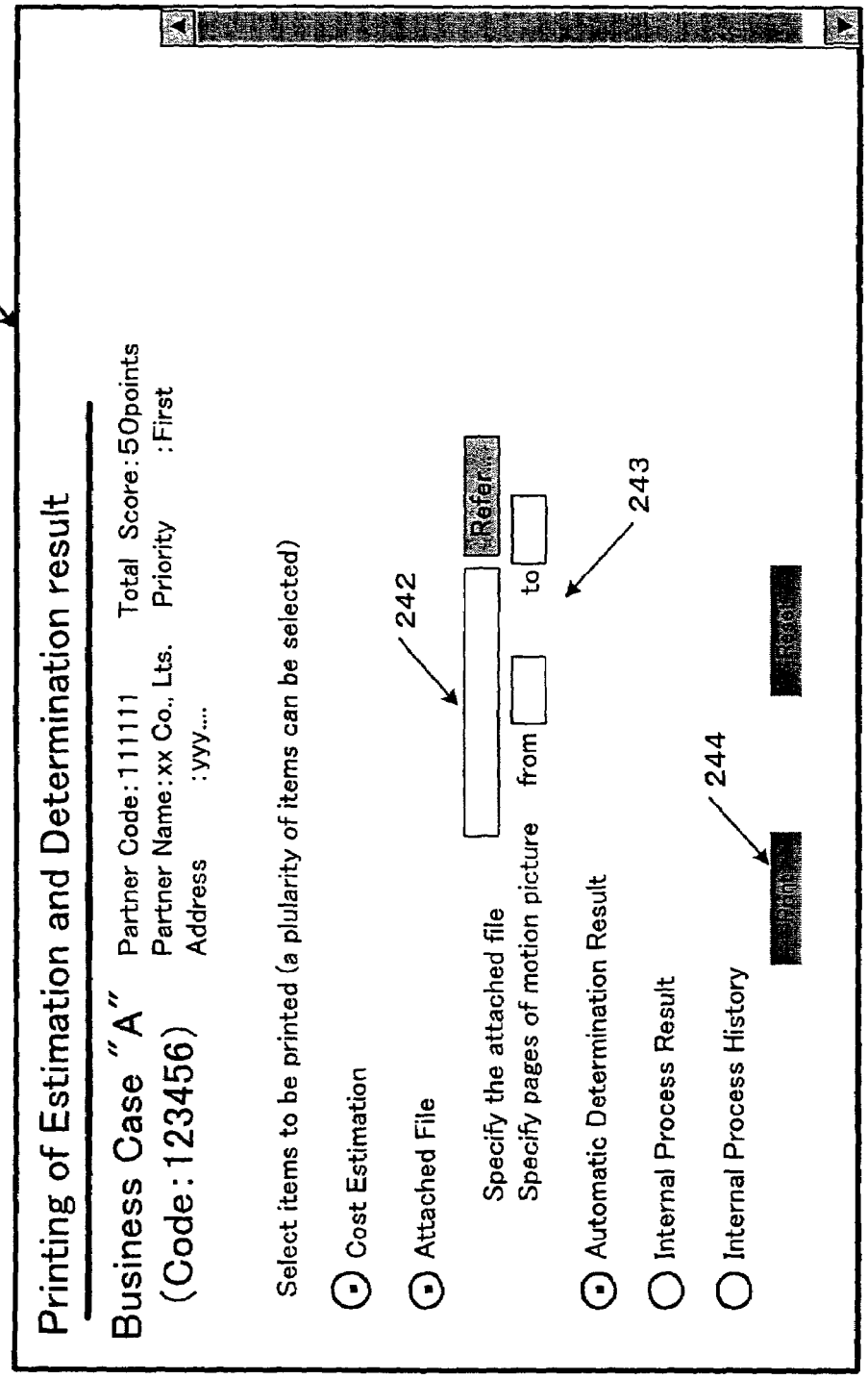
FIG. 24 shows an example of a printing screen according to an embodiment of the present invention.

FIG. 18 shows the printing routine shown in FIG. 14. In step 181, a printing screen is displayed. FIG. 24 shows an example of the printing screen. A screen 240 includes radio buttons for selection of items to be printed (241). A plurality of radio buttons can be selected. When an attached file is printed, the name of the attached file is entered in a field 242. When a motion picture is included in the attached file, pages to be printed can be specified in a field 243. When no page is specified, the first page of the image is printed.

Referring to FIG. 18 again, if a print button 244 is clicked in step 182, then data corresponding to the selected radio buttons is extracted from the determination result DB 44 (183), and a printing template corresponding to the selected radio buttons is extracted from the template file 47 (184). For example, if "Cost Estimation", "Attached File" and "Automatic Determination Result" are selected on the screen 240, then the estimation data field group and the automatic determination field group are extracted from the determination result DB 44, and the printing template defined for the cost estimation and automatic determination result is extracted from the template file 47.

In step 185, the data extracted from the determination result DB 44 is laid out in accordance with the printing template. That is to say, as described above with reference to FIG. 8, data extracted from the determination result DB 44 is set in the parameters on the printing template. Thus, the cost estimation and automatic determination result are printed on A4-size paper (186).

FIG. 25 shows an example of a printed paper. On page 1, the cost estimation and automatic determination result (priority and total score) are printed. On the following pages, the contents of the attached file are printed. Alternatively, it can be printed at a predetermined position on page 1. Depending on the size of the attached file, it may be determined whether the attached file is printed on the first page or the second page. Thus, compactly edited cost estimation can be printed without wasting space of a paper. If "Internal Process Result"and "Internal Process History" are selected on the screen 240, these data can be printed on the following pages.

Thus, all of the cost estimation and determination result are printed in easy-to-read format. Staffers can handle the cost estimation more efficiently.

The electronic document classification system according to the present invention can be applied not only to a cost estimation document, but also to various kinds of electronic documents. In this case, it is preferable that an identification code is assigned for each kind of electronic document. An input form and a criteria table may be defined for each kind of electronic document. The automatic determination part is preferably provided for each kind of electronic document. The score table may be defined depending on the kind of electronic document. The automatic determination part may obtain a score to be assigned depending on the kind of electronic document. In addition, the electronic mail template and printing template may be prepared depending on the kind of electronic document. Thus, a plurality of kinds of electronic documents can be simultaneously classified in a single electronic document classification system. As a result, the efficiency of handling electronic documents is improved.

What is claimed is:

1. A system for classifying cost estimations from a plurality of business partners, the system provided on a computer of a requesting side that requests each of the plurality of business partners to submit a cost estimation;

means for receiving the cost estimation as electronic document from a computer of each of the plurality of business partners via a network;

a criteria table for storing a target value for each of items included in the electronic document and a score that is predetermined in accordance with a value of each of the items;

a partner table for storing, for each of the plurality of business partners, a partner code for identifying the business partner and attributes evaluated for the business partner;

wherein the criteria table further stores a score that is predetermined corresponding to each of the evaluated attributes;

a score counter provided corresponding to the received electronic document;

a controller configured to:

compare the value of each item included in each of the received documents with the target value to determine documents including an item that does not meet the target value as being rejected;

for each of documents that are not determined as being rejected, extract from the criteria table a score corresponding to the value of each item included in each of the received documents to add the extracted score to the score counter;

for each of the documents tat are not determined as being rejected, read from the document a partner code for identifying a business partner from which the document is received, access the partner table to extract attributes evaluated for a business partner indicated by the partner code, extract from the criteria table a score corresponding to the extracted attributes and add the extracted score to the score counter; and assign, in accordance with a value of the score counter, a priority to each of the documents that are not determined as being rejected.

2. The system of claim 1, wherein the criteria table is provided corresponding to the kind of electronic document.

3. The system of claim 1 in which the network is the Internet; and wherein the controller is further configured to provide an input form page in which a user inputs the contents of the electronic document; and wherein the electronic document is transferred to the electronic document classification system by clicking a button provided on the input form page.

4. The system of claim 1, wherein the transferred electronic documents are temporarily stored in an external server provided outside the classification system; and wherein, when a predetermined amount of the electronic documents are stored in the external server or when a predetermined time has elapsed, the electronic documents stored in the external server are transferred to the classification system.

5. The system of claim 4, wherein the controller is further configured, in response to a request for printing the electronic document, to place an attached file on a predetermined position of the paper if the attached file is included in the electronic document.

6. The system of claim 1, wherein the controller is further configured, in response to a request for printing the electronic document, to lay out the contents of the electronic document on paper in accordance with the size of the paper.

7. The system of claim 1, wherein the controller is further configured to enable a user to determine whether the electronic document is acceptable based on the assigned priority; and wherein the controller is further configured to generate an electronic mail for a rejection notice if it is determined that the electronic document is not acceptable, and to generate an electronic mail for an acceptance notice if it is determined that the electronic document is acceptable.

8. The system of claim 1, further comprising:

a determination result storage for storing the value of the assigned priority for each of the electronic documents;

wherein the controller is further configured to provide a page in which a user can modify the value of the assigned priority; and wherein the controller is further configured to update the value of the assigned priority stored in the determination result storage in response to an instruction for modification provided by the user on the page.

9. The system of claim 1, further comprising a history data storage for storing the progress relating to the electronic document; and wherein the controller is further configured to provide a page in which a user can check on the progress of handling the electronic documents.

10. The system of claim 1, wherein the criteria table further stores a target score that is to be satisfied by the electronic documents;

wherein the system further comprises means for setting a recommendation flag in electronic documents having the score counter that has a value greater than the target score, and means for extracting the electronic documents in which the recommendation flag is set.

11. The system of claim 1, wherein the controller is further configured to display the documents assigned the priorities in order of their priorities for enabling a user to refer to the documents and determine a finally accepted document in response to an input by the user.

12. A method for classifying cost estimations received from a plurality of business partners, the method performed by a computer for a requesting side that request a each of the plurality of business partners to submit a cost estimation, the computer comprising means for receiving the cost estimation as electronic document from a computer of each of the plurality of business partners via a network, a criteria table for storing a target value for each of items included in the electronic document and a score that is predetermined in accordance with a value of each of the items, a partner table for storing, for each of the plurality of business partners, a partner code for identifying the business partner and attributes evaluated for the business partner, the criteria table storing a score that is predetermined corresponding to each of the evaluated attributes, and a score counter provided corresponding to the received electronic document, the method comprising the steps of:

(a) comparing the value of each item included in each of the received documents with the target value to determine documents including an item that does not meet the target value as being rejected;

(b) for each of documents that are not determined as being rejected, extracting from the criteria table a score corresponding to the value of each item included in each of the received documents to add the extracted score to the score counter;

(c) for each of the documents that are not determined as being rejected, reading from the document a partner code for identifying a business partner from which the document is received, accessing the partner table to extract attributes evaluated for a business partner indicated by the partner code, extracting from the criteria table a score corresponding to the extracted attributes and adding the extracted score to the score counter; and assigning, in accordance with a value of the score counter, a priority to each of the documents that are not determined as being rejected.

13. The method of claim 12, wherein the criteria table is provided corresponding to the kind of electronic document.

14. The method of claim 12 in which the network is the Internet; and wherein the method further comprises the steps of:

providing an input form page in which a user inputs the contents of the electronic document; and activating a transfer of the electronic document in response to a click of a button provided on the input form page.

15. The method of claim 12, further comprising activating an internal process in response to a request provided by a user, the internal process including at least one of inquiry, approval, modification, e-mail generation and printing processes.

16. The method of claim 15, wherein the internal process includes a printing process; and wherein, in response to a request for printing the electronic document, laying out the contents of the electronic document on paper in accordance with the size of the paper.

17. The method of claim 15, wherein the internal process is performed via interaction between a user and a personal computer.

18. The method of claim 12, wherein the criteria table further stores a target score that is to be satisfied by the electronic documents;

wherein the method further comprises the steps of:

setting a recommendation flag in electronic documents having the score counter that has a value greater than the target score, and extracting the electronic documents in which the recommendation flag is set.

19. The method of claim 12, further comprising the step of displaying the documents thus assigned the priorities in order of their priorities for enabling a user to refer to the documents and determine a finally accepted document in response to an input by the user.

* * * * *

UNITED STATES PATENT AND TRADEMARK OFFICE
CERTIFICATE OF CORRECTION

PATENT NO. : 7,000,178 B2  Page 1 of 1
APPLICATION NO. : 09/886340
DATED : February 14, 2006
INVENTOR(S) : Jiyunji Uchida and Yoshimobu Hara It is certified that error appears in the above-identified patent and that said Letters Patent is hereby corrected as shown below:

Inventors: Title Page (75) Please delete "Unchida" and replace with --Uchida--.

[Column 14, line 28, after the word --request--, please delete "a".]

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,000,178 B2 | Page 1 of 1 |
| APPLICATION NO. | : 09/886340 | |
| DATED | : February 14, 2006 | |
| INVENTOR(S) | : Uchida et al. | |

It is certified that error appears in the above-identified patent and that said Letters Patent is hereby corrected as shown below:

In column 14, line 28, insert --a-- after "request".

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 7,000,178 B2  Page 1 of 1
APPLICATION NO. : 09/886340
DATED : April 14, 2006
INVENTOR(S) : Jiyunji Uchida and Yoshimobu Hara It is certified that error appears in the above-identified patent and that said Letters Patent is hereby corrected as shown below:

Column 14, line 28, after the word --request--, please delete "a".

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,000,178 B2 | Page 1 of 1 |
| APPLICATION NO. | : 09/886340 | |
| DATED | : February 14, 2006 | |
| INVENTOR(S) | : Jiyunji Uchida and Yoshimobu Hara | |

It is certified that error appears in the above-identified patent and that said Letters Patent is hereby corrected as shown below:

Column 14, line 28, after the word --request--, please delete "a".

This certificate supersedes Certificate of Correction issued November 21, 2006.

Signed and Sealed this

Second Day of January, 2007

JON W. DUDAS
*Director of the United States Patent and Trademark Office*